US012601672B2

(12) United States Patent    (10) Patent No.:   US 12,601,672 B2
Bedau et al.    (45) Date of Patent:   Apr. 14, 2026

(54) SENSITIVITY AMPLIFICATION TECHNIQUES FOR MAGNETOCHEMICAL SENSORS

(71) Applicant: Western Digital Technologies, Inc., San Jose, CA (US)

(72) Inventors: Daniel Bedau, San Jose, CA (US); Alexander Elias, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 256 days.

(21) Appl. No.: 18/352,398

(22) Filed: Jul. 14, 2023

(65) Prior Publication Data

US 2024/0125687 A1   Apr. 18, 2024

Related U.S. Application Data

(60) Provisional application No. 63/379,399, filed on Oct. 13, 2022.

(51) Int. Cl.
   *G01N 15/06*      (2024.01)
(52) U.S. Cl.
   CPC ................................ *G01N 15/0656* (2013.01)
(58) Field of Classification Search
   CPC ........... G01N 15/0656; G01N 33/2858; G01N 2015/0053; G01N 15/0606; G01N 15/1031
   See application file for complete search history.

(56) References Cited

U.S. PATENT DOCUMENTS

| | | | |
|---|---|---|---|
| 8,513,029 B2 | 8/2013 | Zhou | |
| 8,623,668 B2 * | 1/2014 | Wirix-Speetjens | .... B82Y 30/00 |
| | | | 436/526 |
| 8,828,740 B2 | 9/2014 | Kahlman et al. | |
| 2002/0166800 A1 * | 11/2002 | Prentiss | ........... G01N 33/54366 |
| | | | 209/214 |

(Continued)

FOREIGN PATENT DOCUMENTS

EP       3992654 A1    5/2022

OTHER PUBLICATIONS

D. D. Liyanage, R. J. K. A. Thamali, A. A. K. Kumbalatara, J. A. Weliwita, and S. Witharana, "An Analysis of Nanoparticle Settling Times in Liquids," Journal of Nanomaterials, vol. 2016, pp. 1-7, 2016, doi: 10.1155/2016/7061838.

(Continued)

*Primary Examiner* — Feba Pothen

(57)      ABSTRACT

A device may include a fluid region. A device may also include a magnetochemical sensor for detecting magnetic particles in the fluid region, wherein the magnetochemical sensor comprises: a first ferromagnetic layer, a second ferromagnetic layer, and a spacer layer situated between and coupled to the first ferromagnetic layer and the second ferromagnetic layer. A device may further include a current-carrying structure for drawing the magnetic particles in the fluid region toward the magnetochemical sensor, wherein: the current-carrying structure consists of a single, undivided structure, and the current-carrying structure is configured to carry a current in at least one direction that is substantially parallel to an in-plane axis or a longitudinal axis of the magnetochemical sensor. The magnetochemical sensor may be one of a plurality of magnetochemical sensors in a sensor array.

26 Claims, 27 Drawing Sheets

(56) References Cited

U.S. PATENT DOCUMENTS

| | | | | |
|---|---|---|---|---|
| 2004/0021073 | A1* | 2/2004 | Barbic | B01F 33/30 |
| | | | | 250/298 |
| 2008/0284419 | A1 | 11/2008 | Ikeda | |
| 2015/0204951 | A1 | 7/2015 | Holm et al. | |
| 2018/0237850 | A1* | 8/2018 | Mandell | C12Q 1/6869 |
| 2020/0326392 | A1* | 10/2020 | Braganca | G01R 33/091 |
| 2021/0156851 | A1 | 5/2021 | Bedau | |
| 2022/0193670 | A1 | 6/2022 | Astier et al. | |
| 2023/0243778 | A1 | 8/2023 | Bedau et al. | |

OTHER PUBLICATIONS

D. Kelland, H. Kolm, C. deLatour, E. Maxwell, and J. Oberteuffer, "High Gradient Magnetic Separation: An Industrial Application of Magnetism," in Superconducting Machines and Devices: Large Systems Applications, S. Foner and B. B. Schwartz, Eds. Boston, MA: Springer US, 1974, pp. 581-594. doi: 10.1007/978-1-4684-2784-4_10.

Electric and Magnetic Fields channel, "Magnetic Field of a Wire," YouTube video available at www.youtube.com/watch?v=caHXwJbkbQU (screen shots submitted), May 29, 2018.

H. Kolm, E. Maxwell, J. Oberteuffer, D. Kelland, C. Delatour, and P. Marston, "High Intensity Magnetic Filtration," AIP Conference Proceedings, vol. 5, No. 1, pp. 949-949, Mar. 1972, doi: 10.1063/1.2953948.

J. Oberteuffer, "High gradient magnetic separation," IEEE Transactions on Magnetics, vol. 9, No. 3, pp. 303-306, Sep. 1973, doi: 10.1109/TMAG.1973.1067673.

Lean n hv fun channel, "Magnetic field due to a current carrying straight conductor || Magnetic effect of electric current," YouTube video available at www.youtube.com/watch?v=5fY74-v96N0 (screen shots submitted), May 21, 2021.

W. F. Lawson, W. H. Simons, and R. P. Treat, "The dynamics of a particle attracted by a magnetized wire," Journal of Applied Physics, vol. 48, No. 8, pp. 3213-3224, Aug. 1977, doi: 10.1063/1.324147.

* cited by examiner

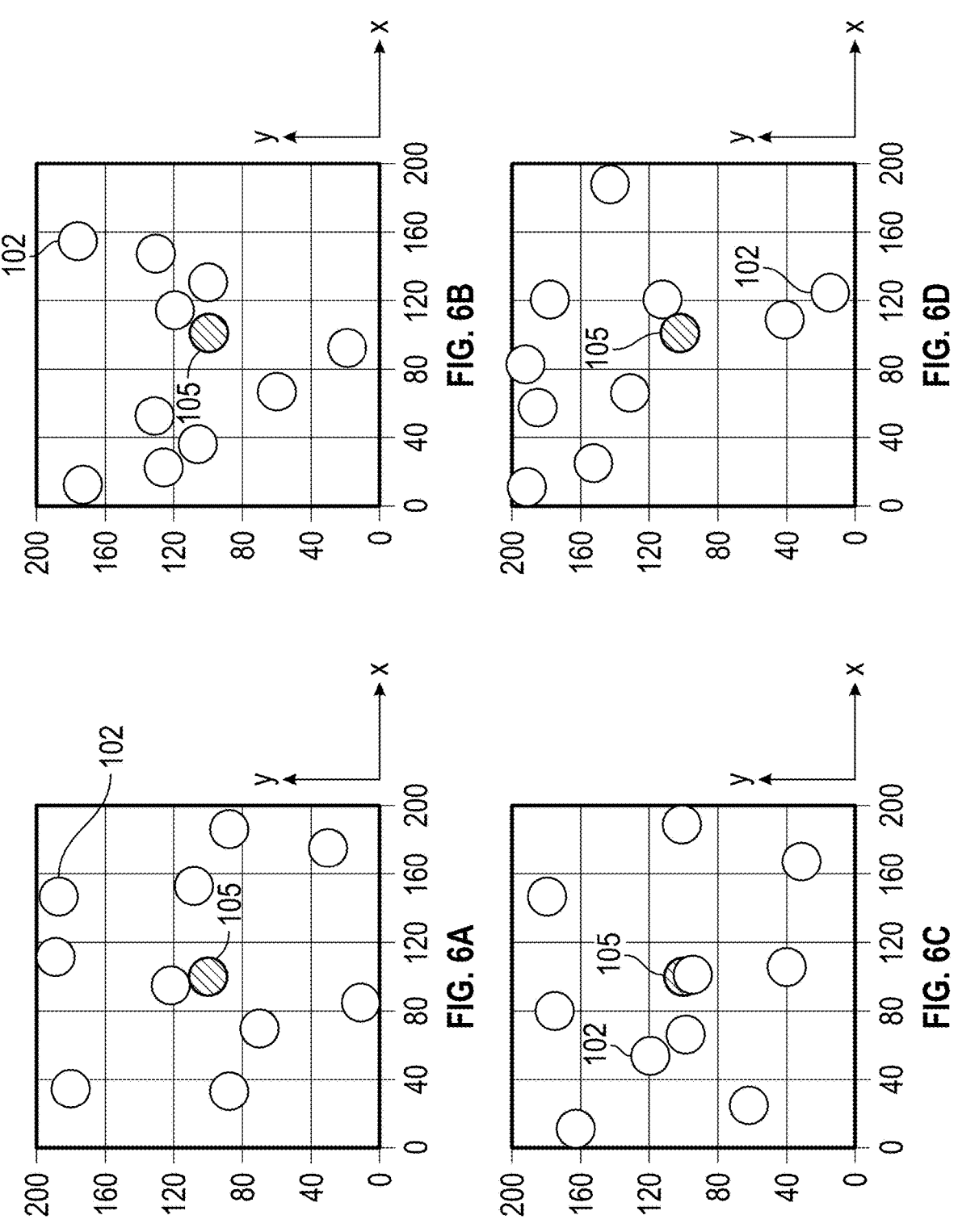

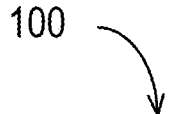
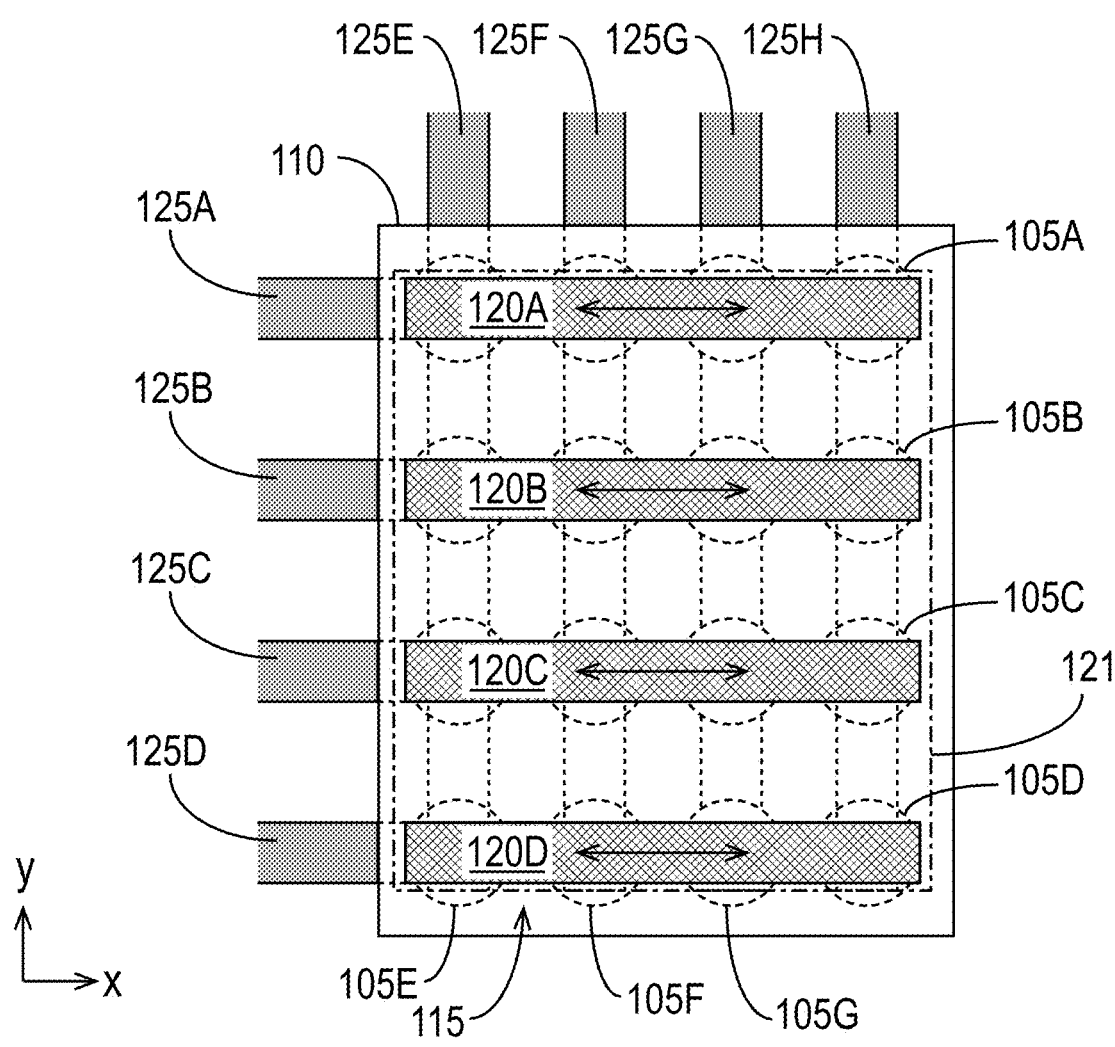
FIG. 10A

620

680

Start

Turn on particle
attraction circuit                    682

Allow particles to
be attracted                          684

Detect particle(s) using
detection circuit with a              686
first polarity Flip polarity of
detection circuit                     688

Detect molecule(s)
using detection circuit               690
with a second polarity Average detection                     692
results End

SENSITIVITY AMPLIFICATION TECHNIQUES FOR MAGNETOCHEMICAL SENSORS

CROSS-REFERENCE TO RELATED APPLICATIONS

This application claims the benefit of, and hereby incorporates by reference in its entirety for all purposes, U.S. provisional application No. 63/379,399, filed Oct. 13, 2022 and entitled "SENSITIVITY AMPLIFICATION TECHNIQUES FOR MAGNETOCHEMICAL SENSORS".

BACKGROUND

Magnetochemical sensors can be used in various applications to detect the presence of a chemical or biological agent by, for example, detecting the presence of a magnetic particle coupled to the chemical or biological agent. The magnetic particles can be, for example, magnetic nanoparticles, etc.

Because the magnetic particles are small and generate small, localized magnetic fields, one challenge in using magnetochemical sensors is to bring the magnetic particles in close enough proximity to a magnetochemical sensor to allow their magnetic fields to be detected.

BRIEF DESCRIPTION OF THE DRAWINGS

Objects, features, and advantages of the disclosure will be readily apparent from the following description of certain embodiments taken in conjunction with the accompanying drawings in which:

FIGS. 6A, 6B, 6C, and 6D illustrate four example random distributions of ten magnetic particles across a surface of a detection device that includes a magnetochemical sensor.

FIG. 10A illustrates portions of an example of a detection device that includes a sensor array of magnetochemical sensors in a rectangular configuration in accordance with some embodiments.

Figure 1:
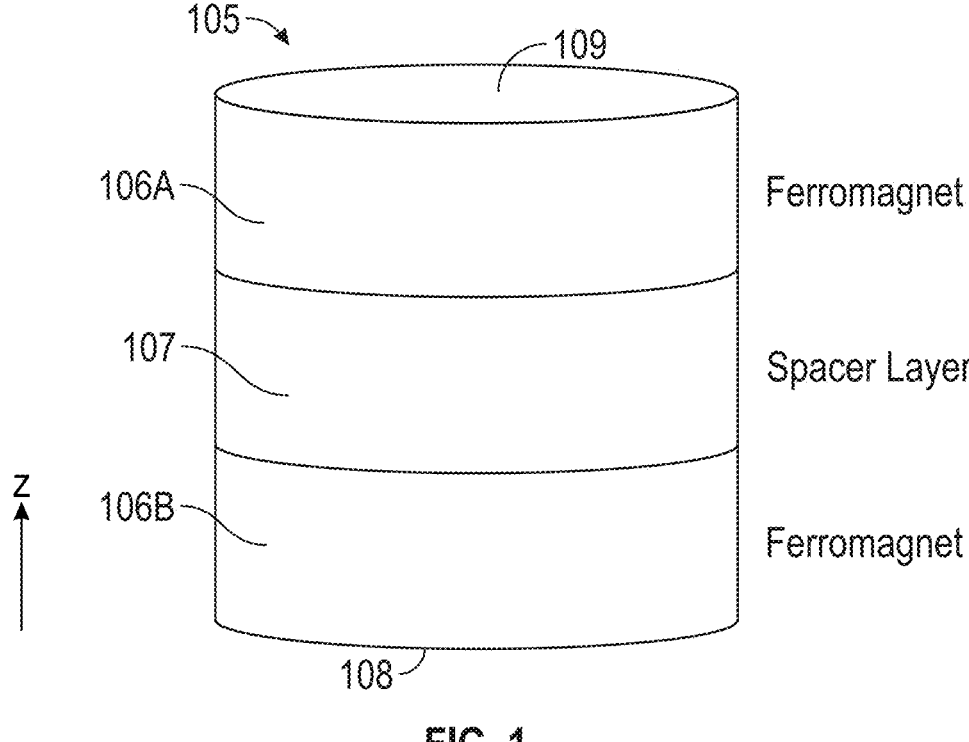
FIG. 1 illustrates a portion of an example magnetochemical sensor in accordance with some embodiments.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Disclosed herein are systems, devices, and methods to improve the likelihood that a magnetochemical sensor is able to detect magnetic particles coupled to molecules being detected and/or monitored. The detection probability is increased by providing at least one current-carrying structure that, when current passes through it, creates a magnetic field that draws magnetic particles toward the magnetochemical sensor. The current passing through the current-carrying structure can also transit the magnetochemical sensor.

In some aspects, the techniques described herein relate to a detection device, including: a fluid region; a magnetochemical sensor for detecting magnetic particles in the fluid region, wherein the magnetochemical sensor includes: a first ferromagnetic layer, a second ferromagnetic layer, and a spacer layer situated between and coupled to the first ferromagnetic layer and the second ferromagnetic layer; and a current-carrying structure for drawing the magnetic particles in the fluid region toward the magnetochemical sensor, wherein: the current-carrying structure consists of a single, undivided structure, and the current-carrying structure is configured to carry a current in at least one direction that is substantially parallel to an in-plane axis or a longitudinal axis of the magnetochemical sensor.

In some aspects, the techniques described herein relate to a detection device, wherein the current-carrying structure is an electrode coupled to the magnetochemical sensor, the electrode for reading the magnetochemical sensor.

In some aspects, the techniques described herein relate to a detection device, wherein a width or thickness of the current-carrying structure is non-uniform.

In some aspects, the techniques described herein relate to a detection device, wherein a minimum width or thickness of the current-carrying structure is less than or equal to about 5 nm and a maximum width or thickness of the current-carrying structure is greater than or equal to about 50 μm.

In some aspects, the techniques described herein relate to a detection device, wherein the current-carrying structure is a trace or a via of a printed circuit board.

In some aspects, the techniques described herein relate to a detection device, wherein the current-carrying structure is configured to carry the current in two directions that are substantially parallel to the in-plane axis or the longitudinal axis of the magnetochemical sensor.

In some aspects, the techniques described herein relate to a detection device, wherein the magnetochemical sensor is one of a plurality of magnetochemical sensors included in the detection device.

In some aspects, the techniques described herein relate to a detection device, wherein the plurality of magnetochemical sensors is arranged in a rectangular array, and wherein the at least one direction is aligned with a row or a column of the rectangular array.

In some aspects, the techniques described herein relate to a detection device, wherein the current-carrying structure includes an electrode for reading a row or a column of the rectangular array.

In some aspects, the techniques described herein relate to a detection device, wherein the electrode is a first electrode, and further including a second electrode coupled to the magnetochemical sensor, the second electrode for reading the magnetochemical sensor.

In some aspects, the techniques described herein relate to a detection device, wherein the current-carrying structure includes a wire mesh.

In some aspects, the techniques described herein relate to a detection device, wherein the wire mesh is situated in the fluid region.

In some aspects, the techniques described herein relate to a detection device, wherein the current-carrying structure has a non-uniform width.

In some aspects, the techniques described herein relate to a detection device, wherein the magnetochemical sensor includes a magnetoresistive sensor.

In some aspects, the techniques described herein relate to a detection device, wherein the current-carrying structure is a single wire.

In some aspects, the techniques described herein relate to a detection device, wherein the current-carrying structure is a trace.

In some aspects, the techniques described herein relate to a detection device, wherein the trace is situated in a wafer or a printed circuit board.

In some aspects, the techniques described herein relate to a detection device, wherein the fluid region is situated between the magnetochemical sensor and the wafer or printed circuit board.

In some aspects, the techniques described herein relate to a system including: the detection device; and an agitator.

In some aspects, the techniques described herein relate to a system, wherein the agitator is configured to rotate or move the detection device in at least two directions.

In some aspects, the techniques described herein relate to a system, wherein the agitator is configured to mechanically agitate the detection device.

In some aspects, the techniques described herein relate to a system, wherein the agitator includes at least one of: an electric motor, an unbalanced mass, a vibration plate, a vibration table, a piezoelectric actuator, or a piezoelectric motor.

In some aspects, the techniques described herein relate to a system, wherein the agitator is configured to pulse fluid in the fluid region.

In some aspects, the techniques described herein relate to a method of using the device described above, the method including: causing a current to flow through the current-carrying structure; and obtaining a first measurement result, the first measurement result providing at least one characteristic of the magnetochemical sensor after (b), the at least one characteristic indicating whether at least one magnetic particle has been detected by the magnetochemical sensor.

In some aspects, the techniques described herein relate to a method, further including: while the current flows through the current-carrying structure, waiting for a period of time to allow the at least one magnetic particle to be attracted to the current-carrying structure.

In some aspects, the techniques described herein relate to a method, further including: while the current flows through the current-carrying structure, agitating a contents of the fluid region.

In some aspects, the techniques described herein relate to a method, further including: stopping the current from flowing through the current-carrying structure before obtaining the first measurement result.

In some aspects, the techniques described herein relate to a method, wherein obtaining the first measurement result occurs while the current flows through the current-carrying structure.

In some aspects, the techniques described herein relate to a method of using the device described above, the method including: causing a current to flow in a first direction through the current-carrying structure; obtaining a first measurement result while the current flows in the first direction through the current-carrying structure, the first measurement result providing at least one characteristic of the magnetochemical sensor, the at least one characteristic indicating whether at least one magnetic particle has been detected by the magnetochemical sensor; causing the current to flow in a second direction through the current-carrying structure, wherein the second direction is opposite the first direction; obtaining a second measurement result while the current flows in the second direction through the current-carrying structure, the second measurement result providing the at least one characteristic of the magnetochemical sensor; determining an average of the first measurement result and the second measurement result; and based at least in part on the average, determining whether at least one magnetic particle has been detected by the magnetochemical sensor.

In some aspects, the techniques described herein relate to a method, further including: before obtaining the first measurement, and/or before obtaining the second measurement, waiting for a period of time to allow the at least one magnetic particle to be attracted to the current-carrying structure.

In some aspects, the techniques described herein relate to a method, further including: while the current flows in the first direction through the current-carrying structure, agitating a contents of the fluid region; and while the current flows in the second direction through the current-carrying structure, agitating the contents of the fluid region.

In some aspects, the techniques described herein relate to a system, including: a detection device including: a fluid region, an magnetochemical sensor array including a plurality of magnetochemical sensors, each magnetochemical sensor of the plurality of magnetochemical sensors for detecting magnetic particles in the fluid region, and an array of current-carrying structures situated over the magnetochemical sensor array, wherein the array of current-carrying structures is configured to draw the magnetic particles in the fluid region toward the magnetochemical sensor array; and means for agitating fluid in the fluid region.

In some aspects, the techniques described herein relate to a system, further including: circuitry to read the plurality of magnetochemical sensors, the circuitry including a plurality of selector devices.

In some aspects, the techniques described herein relate to a system, wherein the plurality of magnetochemical sensors and the plurality of selector devices are in a one-to-one relationship.

In some aspects, the techniques described herein relate to a system, wherein the circuitry includes a current generator configured to generate an AC current and/or a superposition of a DC current and an AC current.

In some aspects, the techniques described herein relate to a system, wherein the magnetochemical sensor array is a rectangular array in which the plurality of magnetochemical sensors is arranged in rows and columns.

In some aspects, the techniques described herein relate to a system, wherein the array of current-carrying structures includes a wire mesh situated in the fluid region.

In some aspects, the techniques described herein relate to a system, wherein the array of current-carrying structures is situated in a wafer or printed circuit board, and wherein the fluid region is situated between the magnetochemical sensor array and the wafer or printed circuit board.

In some aspects, the techniques described herein relate to a method of detecting magnetic particles using a detection device including a particle attraction circuit and a detection circuit, the particle attraction circuit including a current-carrying structure, the detection circuit configured to read a magnetochemical sensor, the method including: (a) activating the particle attraction circuit to cause current to flow through the current-carrying structure; (b) deactivating the particle attraction circuit to stop the current from flowing through the current-carrying structure; and (c) the particle detection circuit obtaining a first measurement result, the first measurement result providing at least one characteristic of the magnetochemical sensor after (b), the at least one characteristic indicating whether at least one magnetic particle has been detected by the magnetochemical sensor.

In some aspects, the techniques described herein relate to a method, further including: between (a) and (b), waiting for a period of time to allow the at least one magnetic particle to be attracted to the current-carrying structure.

In some aspects, the techniques described herein relate to a method, wherein the detection device further includes a fluid region, and wherein the method further includes: between (a) and (b), agitating a contents of the fluid region.

In some aspects, the techniques described herein relate to a method of detecting magnetic particles using a detection device including a particle attraction circuit and a detection circuit, the particle attraction circuit including a current-carrying structure, the detection circuit configured to read a magnetochemical sensor, the method including: (a) the particle attraction circuit causing a current to flow in a first direction through the current-carrying structure; (b) the particle detection circuit obtaining a first measurement result, the first measurement result providing at least one characteristic of the magnetochemical sensor after (a), the at least one characteristic indicating whether at least one magnetic particle has been detected by the magnetochemical sensor; (c) the particle attraction circuit causing the current to flow in a second direction through the current-carrying structure, wherein the second direction is opposite the first direction; (d) the particle detection circuit obtaining a second measurement result, the second measurement result providing the at least one characteristic of the magnetochemical sensor after (c); (e) averaging the first measurement result and the second measurement result; and (f) based at least in part on a result of (e), determining whether at least one magnetic particle has been detected by the magnetochemical sensor.

In some aspects, the techniques described herein relate to a method, further including: between (a) and (b) and/or between (c) and (d), waiting for a period of time to allow the at least one magnetic particle to be attracted to the current-carrying structure.

In some aspects, the techniques described herein relate to a method, wherein the detection device further includes a fluid region, and wherein the method further includes: between (a) and (b), agitating a contents of the fluid region, and between (c) and (d), agitating the contents of the fluid region.

In some aspects, the techniques described herein relate to a method of detecting magnetic particles using a detection device including a particle attraction circuit and a detection circuit, the particle attraction circuit including a current-carrying structure, the detection circuit having a selectable polarity, the detection circuit configured to read a magnetochemical sensor, the method including: (a) the particle attraction circuit causing a current to flow through the current-carrying structure; (b) the particle detection circuit obtaining a first measurement result using a selected first polarity, the first measurement result providing at least one characteristic of the magnetochemical sensor, the at least one characteristic indicating whether at least one magnetic particle has been detected by the magnetochemical sensor; (c) the particle detection circuit obtaining a second measurement result using a selected second polarity, the selected second polarity being opposite the selected first polarity, the second measurement result providing the at least one characteristic of the magnetochemical sensor; (d) averaging the first measurement result and the second measurement result; and (e) based at least in part on a result of (d), determining whether at least one magnetic particle has been detected by the magnetochemical sensor.

In some aspects, the techniques described herein relate to a method, further including: between (a) and (b), waiting for a period of time to allow the at least one magnetic particle to be attracted to the current-carrying structure.

In some aspects, the techniques described herein relate to a method, wherein the detection device further includes a fluid region, and wherein the method further includes: between (a) and (b), agitating a contents of the fluid region.

In some aspects, the techniques described herein relate to a system for detecting magnetic particles, the system including: a magnetochemical sensor; a particle attraction circuit including a current-carrying structure and control circuitry coupled to the current-carrying structure and configured to: (a) cause a current to flow through the current-carrying structure, and (b) stop the current from flowing through the current-carrying structure; and a detection circuit configured to: after (b), obtain a first measurement result, the first measurement result providing at least one characteristic of the magnetochemical sensor, the at least one characteristic indicating whether at least one magnetic particle has been detected by the magnetochemical sensor.

In some aspects, the techniques described herein relate to a system, wherein the detection circuit is further configured to: wait for a period of time to allow the at least one magnetic particle to be attracted to the current-carrying structure.

In some aspects, the techniques described herein relate to a system, further including: a fluid region; and an agitator coupled to the fluid region and configured to agitate a contents of the fluid region.

In some aspects, the techniques described herein relate to a system for detecting magnetic particles, the system including: a magnetochemical sensor; a particle attraction circuit including a current-carrying structure and control circuitry coupled to the current-carrying structure and configured to: (a) cause a current to flow in a first direction through the current-carrying structure, and (b) cause the current to flow in a second direction through the current-carrying structure, wherein the second direction is opposite the first direction; a particle detection circuit configured to: obtain a first measurement result, the first measurement result providing at least one characteristic of the magnetochemical sensor after (a), the at least one characteristic indicating whether at least one magnetic particle has been detected by the magnetochemical sensor, obtain a second measurement result, the second measurement result providing the at least one characteristic of the magnetochemical sensor after (b), determine an average of the first measurement result and the second measurement result, and based at least in part on the average, determining whether at least one magnetic particle has been detected by the magnetochemical sensor.

In some aspects, the techniques described herein relate to a system, wherein the particle detection circuit is further configured to: after (a) and/or after (b), wait for a period of time to allow the at least one magnetic particle to be attracted to the current-carrying structure.

In some aspects, the techniques described herein relate to a system, further including: a fluid region; and an agitator coupled to the fluid region and configured to agitate a contents of the fluid region.

In some aspects, the techniques described herein relate to a system for detecting magnetic particles, including: a magnetochemical sensor; a particle attraction circuit including a current-carrying structure and control circuitry coupled to the current-carrying structure and configured to cause a current to flow through the current-carrying structure; and a detection circuit having a selectable polarity, the detection circuit configured to: obtain a first measurement result using a selected first polarity, the first measurement result providing at least one characteristic of the magnetochemical sensor, the at least one characteristic indicating whether at least one magnetic particle has been detected by the magnetochemical sensor, obtain a second measurement result using a selected second polarity, the selected second polarity being opposite the selected first polarity, the second measurement result providing the at least one characteristic of the magnetochemical sensor, determine an average of the first measurement result and the second measurement result, and based at least in part on the average, determining whether at least one magnetic particle has been detected by the magnetochemical sensor.

In some aspects, the techniques described herein relate to a system, wherein the detection circuit is further configured to: wait for a period of time to allow the at least one magnetic particle to be attracted to the current-carrying structure.

In some aspects, the techniques described herein relate to a system, further including: a fluid region; and an agitator coupled to the fluid region and configured to agitate a contents of the fluid region.

Words such as "over," "top," "bottom," etc. are used herein to describe the relative positions of various elements (e.g., to describe the parts of a magnetochemical sensor 105, to describe the position of a current-carrying structure 120 relative to a magnetochemical sensor 105, etc.) in illustrated orientations. It is to be appreciated that these words are used for convenience of description, and that relative positions depend on orientation (e.g., if in a device a first element is "over" a second element, then the second element is "over" the first element if the device is rotated by 180 degrees). Thus, although the drawings presume particular orientations and positions of elements, and the description herein reflects those orientations and positions, it is to be appreciated that the illustrated and described orientations and relative positions are only examples, and that different descriptions, relative positions, and orientations are possible. As just one example, several of the drawings herein show a magnetochemical sensor 105 with a current-carrying structure 120 situated over the magnetochemical sensor 105. It will be appreciated that in a different orientation of (for example) a detection device 100 containing such a magnetochemical sensor 105, the current-carrying structure 120 can be in a different relative position (e.g., under, to the left, to the right, etc.). The example configurations provided herein are not intended to be limiting.

FIG. 1 illustrates a portion of a magnetochemical sensor 105 in accordance with some embodiments. The example magnetochemical sensor 105 of FIG. 1 has a bottom surface 108 and a top surface 109. For purposes of explanation, the bottom surface 108 and top surface 109 are assumed to be situated in x-y planes. The bottom surface 108 and top surface 109 are referred to herein as "in-plane" surfaces of the magnetochemical sensor 105. Axes or directions in the magnetochemical sensor 105, or in a device comprising the magnetochemical sensor 105, that are parallel to the in-plane surfaces of the magnetochemical sensor 105 are referred to herein as "in-plane axes" or "in-plane directions." It is to be understood that an in-plane axis or an in-plane direction is not required to be parallel or perpendicular to either the x-axis or the y-axis. Accordingly, an in-plane axis can be in any direction parallel to the in-plane surfaces of the magnetochemical sensor 105.

The direction that is perpendicular to the bottom surface 108 and top surface 109 (the positive or negative z-direction relative to the x-y planes of the bottom surface 108 and top surface 109) is referred to herein as the "longitudinal direction." A "longitudinal axis" is an axis that is in the longitudinal direction, parallel to the z-axis illustrated in FIG. 1 and extending either in the positive or negative direction. The bottom surface 108 and top surface 109 are perpendicular to a variety of possible longitudinal axes (each parallel to the z-axis shown in FIG. 1). Thus, each in-plane axis or in-plane direction is, by definition, substantially perpendicular to the z-axis (and, therefore, to each longitudinal axis).

As shown in FIG. 1, the magnetochemical sensor 105 comprises three layers: the ferromagnetic layer 106A, the ferromagnetic layer 106B, and a nonmagnetic spacer layer 107 situated between the ferromagnetic layer 106A and the ferromagnetic layer 106B. The nonmagnetic spacer layer 107 may be, for example, a metallic material such as, for example, copper or silver, in which case the structure is called a spin valve (SV), or it may be an insulator such as, for example, alumina or magnesium oxide, in which case the structure is referred to as a magnetic tunnel junction (MTJ). Suitable materials for use in the ferromagnetic layer 106A and the ferromagnetic layer 106B include, for example, alloys of Co, Ni, and Fe (sometimes mixed with other elements). The ferromagnetic layer 106A and the ferromagnetic layer 106B can be engineered to have their magnetic moments oriented either in the plane of the film (e.g., x-y plane) or perpendicular to the plane of the film (e.g., in the z direction). Additional materials may be deposited below, above, and to the sides of the ferromagnetic layer 106A, ferromagnetic layer 106B, and nonmagnetic spacer layer 107 shown in FIG. 1 to serve purposes such as interface smoothing, texturing, and protection from processing used to pattern the device into which the magnetochemical sensor 105 is incorporated, but the active region of the magnetochemical sensor 105 lies in the tri-layer structure shown in FIG. 1.

Although FIG. 1 shows the magnetochemical sensor 105 as cylindrical, it is to be appreciated that the magnetochemical sensor 105 can have any suitable shape (e.g., it can be cuboid, etc.).

A magnetochemical sensor 105 can detect a magnetic particle as long as the magnetic field of the magnetic particle causes a detectable change in some characteristic of the magnetochemical sensor 105 (e.g., a voltage, current, resistance, oscillation frequency, noise spectrum, etc.). As explained further below, the likelihood that the magnetic particle causes a detectable change to a characteristic of the magnetochemical sensor 105 is dependent on the distance between the magnetochemical sensor 105 and the magnetic particle.

A magnetochemical sensor 105 can use a quantum mechanical effect known as spin transfer torque. In such devices, the electrical current passing through the ferromagnetic layer 106A (or ferromagnetic layer 106B) in a SV or a MTJ preferentially allows electrons with spin parallel to the layer's moment to transmit through, while electrons with spin antiparallel are more likely to be reflected. In this manner, the electrical current becomes spin polarized, with more electrons of one spin type than the other. This spin-polarized current then interacts with the ferromagnetic layer 106B (or ferromagnetic layer 106A), exerting a torque on the layer's moment. This torque can in different circumstances either cause the moment of the ferromagnetic layer 106B (or ferromagnetic layer 106A) to process around the effective magnetic field acting upon the ferromagnet, or it can cause the moment to reversibly switch between two orientations defined by a uniaxial anisotropy induced in the system. The resulting spin torque oscillators (STOs) are frequency-tunable by changing the magnetic field acting upon them. Thus, they have the capability to act as magnetic-field-to-frequency (or phase) transducers (thereby producing an AC signal having a frequency). Changes in the frequency can be detected to detect the presence or absence of magnetic particles near the magnetochemical sensor 105.

Figure 2:
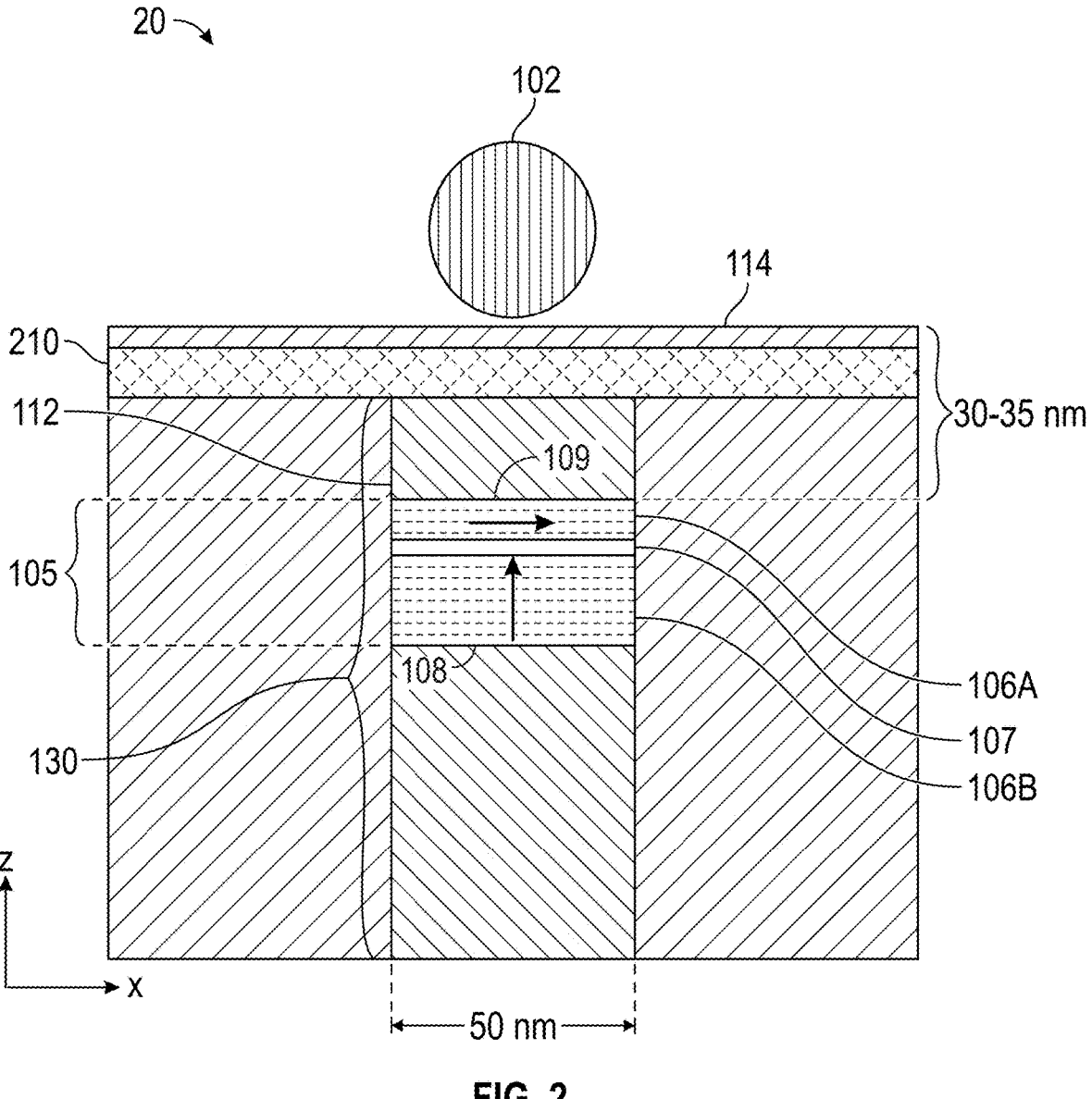
FIG. 2 illustrates the example magnetochemical sensor of FIG. 1 embedded in a sensor stack in accordance with some embodiments.

FIG. 2 illustrates the example magnetochemical sensor 105 of FIG. 1 in the context of an example sensor stack 130 of a detection device 20 with a magnetic particle 102 situated above the sensor stack 130. In the sensor stack 130, the ferromagnetic layer 106B is the pinned layer, and the ferromagnetic layer 106A is the free layer. In the example of FIG. 2, the ferromagnetic layer 106B has a fixed direction of magnetization that is perpendicular to the plane of the ferromagnetic layer 106B. The direction of magnetization of the ferromagnetic layer 106A is variable and is illustrated as being parallel to the plane of the ferromagnetic layer 106A (an x-y plane using the axes shown in FIG. 2). The nonmagnetic spacer layer 107 is situated between the ferromagnetic layer 106A and the ferromagnetic layer 106B as described above. In the example shown in FIG. 2, a layer 112 is situated above the ferromagnetic layer 106A. The optional layer 112 may provide additional perpendicular anisotropy to the ferromagnetic layer 106A as well as protect the underlying layers during manufacture, such as during high temperature annealing. The layer 112 may have, for example, a Ru/Ta/Ru configuration. The sensor stack 130 may be encapsulated in an electrically insulating material as is known in the art.

A lower electrode and an upper electrode may be positioned, respectively, below the bottom surface 108 and above the top surface 109 of the magnetochemical sensor 105. FIG. 2 illustrates the upper electrode 210. The lower and upper electrodes may be constructed of a non-magnetic, electrically conductive material, such as, for example, TaN, TiN, W, etc., and may provide an electrical connection with circuitry that allows the magnetochemical sensor 105 to be read. The circuitry can include, for example, a processor and other components that are well known in the art, such as a current source, one or more switches, etc. In operation, the processor(s) can cause a current to be applied to the electrodes (e.g., including the upper electrode 210) to detect a characteristic of the magnetochemical sensor 105, where the characteristic indicates the presence of at least one magnetic particle 102 or the absence of any magnetic particle 102 within range of the magnetochemical sensor 105. In other words, the characteristic (e.g., resistance, oscillation frequency, voltage, signal level, noise, etc.) indicates whether the magnetochemical sensor 105 has detected at least one magnetic particle 102 or has not detected any magnetic particle 102. The processor(s) may assess the value of the characteristic (e.g., a frequency, a wavelength, a magnetic field, a resistance, a noise level, etc.) and determine that a magnetic particle 102 was (or was not) detected based on a comparison of the value of the characteristic to a threshold (e.g., by determining whether the value of the characteristic for a magnetochemical sensor 105 meets or exceeds a threshold) or a baseline value. As another example, the processor(s) may compare the obtained characteristic of a magnetochemical sensor 105 to a previously-detected value of the characteristic (e.g., a baseline value for the magnetochemical sensor 105) and base the determination of whether a magnetic particle 102 was or was not detected on a change in the value of the characteristic (e.g., a change in magnetic field, resistance, noise level, oscillation frequency, etc.).

FIG. 2 shows a magnetic particle 102 situated directly above the magnetochemical sensor 105. (The molecule to which the magnetic particle 102 may be attached is not illustrated.) The magnetic particle 102 is approximately 30-35 nm away from the top of the magnetochemical sensor 105 due to the presence of, for example, the layer 112 and/or other layers of protective material 114 (e.g., insulator, dielectric, etc.) and the upper electrode 210, which assists in reading the magnetochemical sensor 105. Thus, FIG. 2 illustrates a possible, practical configuration/geometry in which a magnetochemical sensor 105 might be used to detect the presence or absence of a magnetic particle 102.

One characteristic of the magnetochemical sensors 105 described herein is that the change in magnetization caused by the presence of a magnetic particle 102 is temporary. When the magnetic particle 102 is removed or moved away from where it can be detected by a magnetochemical sensor 105, the magnetization of the magnetochemical sensor 105 return to their former values. Thus, the disclosed magnetochemical sensors 105 can be reused (e.g., in multiple cycles of nucleic acid sequencing).

Figure 3A:
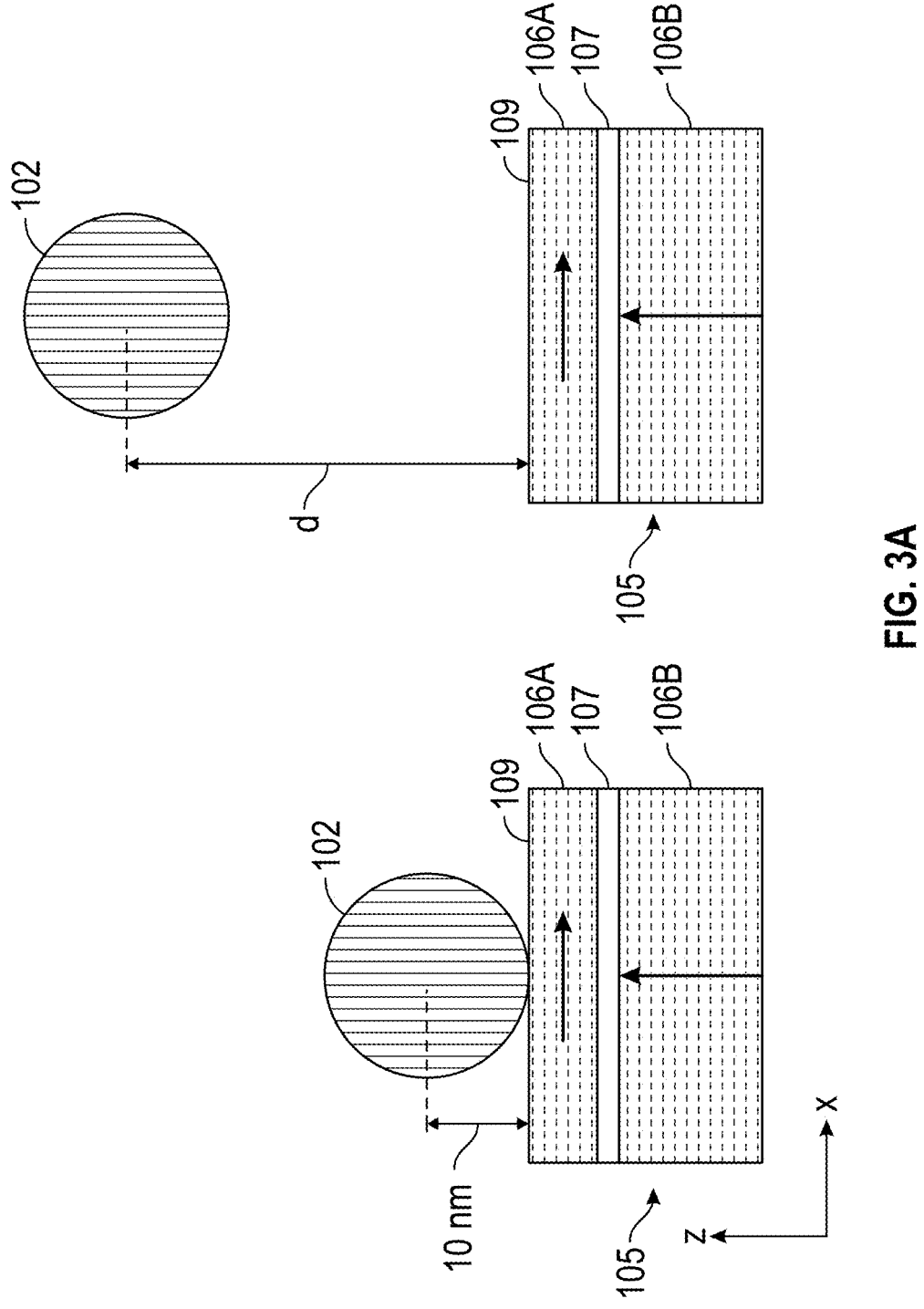
FIG. 3A shows a magnetochemical sensor with a magnetic particle over it in accordance with some embodiments.

FIG. 3A illustrates a configuration of a magnetochemical sensor 105 and a magnetic particle 102 that can be used to illustrate how the detected magnetic flux density varies with the distance, d, between the magnetochemical sensor 105 and the magnetic particle 102. As shown in FIG. 3A, the magnetic particle 102 has a diameter of 20 nm. When the magnetic particle 102 is situated on top of the magnetochemical sensor 105 as shown in the left panel of FIG. 3A, the distance, d, between the upper surface of the magnetochemical sensor 105 and the center of the magnetic particle 102 is 10 nm.

Figure 3B:
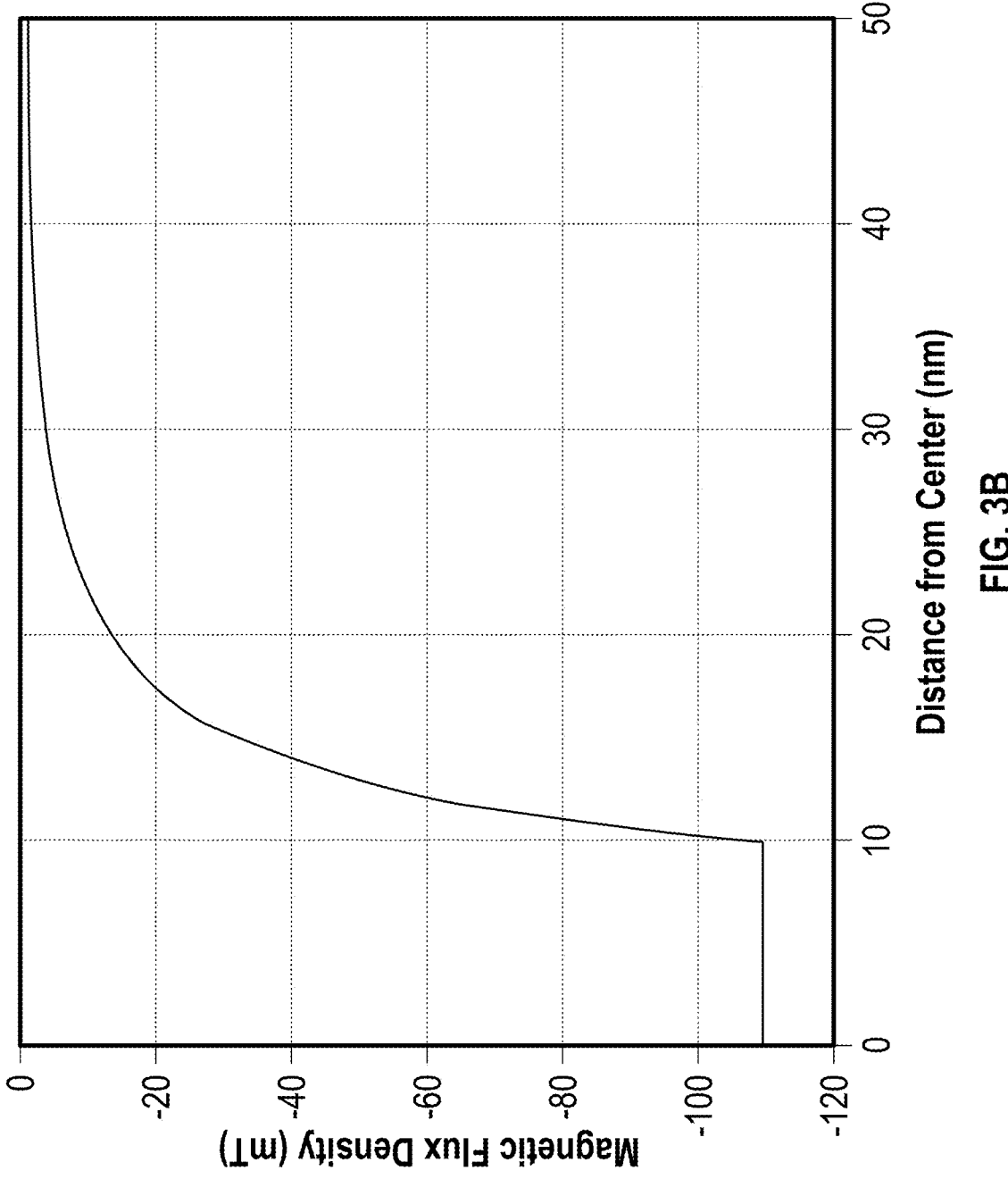
FIGS. 3B and 3C illustrate how the detected magnetic flux density of the magnetic particle varies with its distance from the magnetochemical sensor.
Figure 3C:
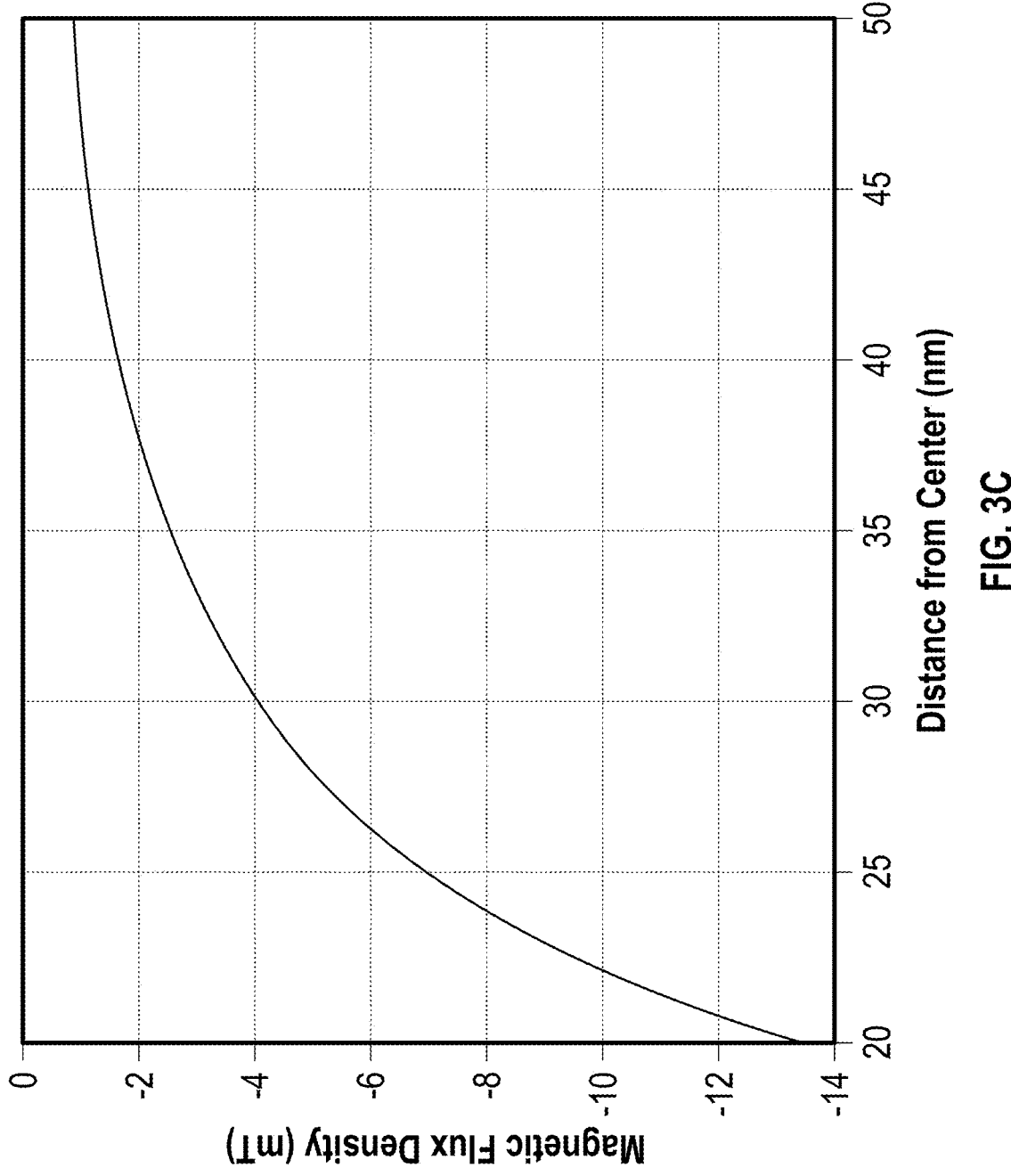

FIGS. 3B and 3C illustrate how the detected magnetic flux density of the magnetic particle 102 varies with its vertical distance, d (shown in the right panel of FIG. 3A), from the top surface 109 of the magnetochemical sensor 105. Specifically, FIGS. 3B and 3C illustrate how the detected magnetic flux density changes as the magnetic particle 102 of FIG. 3A remains laterally centered over the magnetochemical sensor 105 of FIG. 3A, but its center is at various distances, d, above the top surface 109. As FIG. 3B shows, the magnetic field drops rapidly (value approaches 0 in the graph) as the magnetic particle 102 moves away from the magnetochemical sensor 105. FIG. 3B shows that when the magnetic particle 102 is situated on the top surface 109 of the magnetochemical sensor 105 (as shown in the left panel of FIG. 3A), the surface flux density is about 110 mT, but the flux density degrades rapidly as the distance, d, between the top surface 109 and the center of the magnetic particle 102 increases. For example, when the value of d shown in the right panel of FIG. 3A is only 10 nm (meaning that the center of the magnetic particle 102 is 10 nm from the top surface 109), the magnetic field is only about 14 mT. FIG. 3C is a magnified view of the portion of FIG. 3B showing the surface flux density for distances of 20 nm to 50 nm between the center of the magnetic particle 102 and the top surface 109. FIG. 3C indicates that when the center of the magnetic particle 102 is at a distance of 40 nm to 45 nm above the top surface 109, as it would be in the example configuration shown in FIG. 2, the magnetic field is only 1-2 mT as compared to 110 mT when the magnetic particle 102 is situated on the top surface 109 (where d=10 nm). As described further below, although a field of 1-2 mT is detectable using the magnetochemical sensor 105 described above, to improve the likelihood of detection in a practical system, FIGS. 3B and 3C indicate that it is desirable for the magnetic particle 102 to be much closer to the magnetochemical sensor 105 than when its center is 40-45 nm above its top surface 109.

Figure 4:
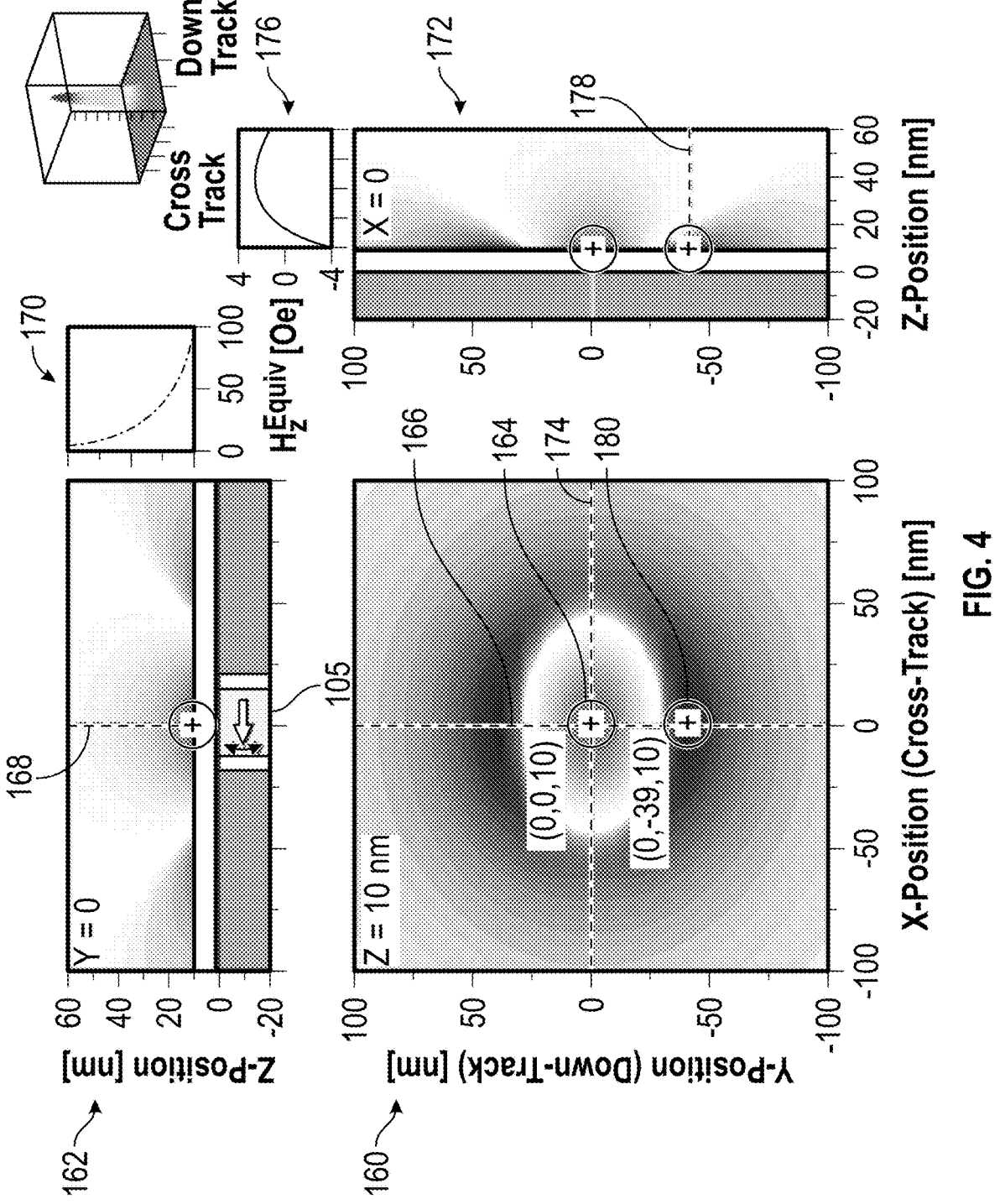
FIG. 4 is another illustration to illustrate how the detected magnetic field caused by the magnetic particle changes with both vertical distance and lateral distance from the magnetochemical sensor.

FIG. 4 illustrates of how the detected magnetic field caused by the magnetic particle 102 changes with both vertical distance and lateral distance from the magnetochemical sensor 105. Specifically, FIG. 4 illustrates the results of nanomagnetic simulations of an exemplary magnetochemical sensor 105 in the presence of a magnetic particle 102 at various lateral and vertical positions relative to the top surface 109 of the magnetochemical sensor 105 in accordance with some embodiments. The contour plot 160 illustrates the magnetic field acting on the magnetochemical sensor 105 for various lateral positions of the magnetic particle 102 in the x-y plane when the center of the magnetic particle 102 is 10 nm above the x-y plane (at a z value of 10 nm). As indicated by the cross section 162, the magnetic sensor 105 is centered at coordinates (0, 0) in the x-y plane, indicated as position 164. The cross section 162 shows the magnetic field magnitude as a function of the lateral position of the magnetic particle 102 along the x-axis at a position of y=0 (indicated by the dashed line 174 in the contour plot 160) and at various positions along the z-axis, ranging from 10 nm to 60 nm away from the surface (e.g., top surface 109) of the magnetochemical sensor 105. The plot 170 shows the magnetic field magnitude along the dashed line 168 in the cross section 162. As shown, when the center of the magnetic particle 102 is 10 nm directly above the magnetochemical sensor 105, the magnetic field magnitude is approximately 100 Oersted, and when the magnetic particle 102 is 60 nm above the magnetochemical sensor 105, the magnetic field magnitude is near 0.

The cross section 172 shows the magnetic field magnitude as a function of the lateral position of the magnetic particle 102 along the y-axis at a position of x=0 (indicated by the dashed line 166 of the contour plot 160) and at various positions along the z-axis, ranging from 10 nm to 60 nm away from the surface (e.g., the top surface 109) of the magnetochemical sensor 105. The plot 176 shows the magnetic field magnitude along the dashed line 178 in the cross section 172, at the position 180 shown in contour plot 160, which is at a lateral offset of 39 nm along the y-axis. As shown, when the center of the magnetic particle 102 is 10 nm above the surface of the magnetochemical sensor 105 and laterally offset by 39 nm, the magnetic field magnitude is approximately −4 Oersted, and when the magnetic particle 102 is 60 nm above the magnetochemical sensor 105 and laterally offset by 39 nm, the magnetic field magnitude is near 0.

Thus, FIGS. 3B, 3C, and 4 illustrate that the magnitude of the magnetic field is strongly dependent on the position of the magnetic particle 102 relative to the magnetochemical sensor 105 and the distance between the magnetic particle 102 and the magnetochemical sensor 105. The detected magnitude changes substantially as the magnetic particle 102 changes position in three-dimensional space. Even slight changes in position cause significant changes in the detected magnetic field. Taken together, FIGS. 3B, 3C, and 4 indicate that the magnetic particle 102 is more likely to be detected when it is closer to the magnetochemical sensor 105 than when it is further away.

Figure 5:
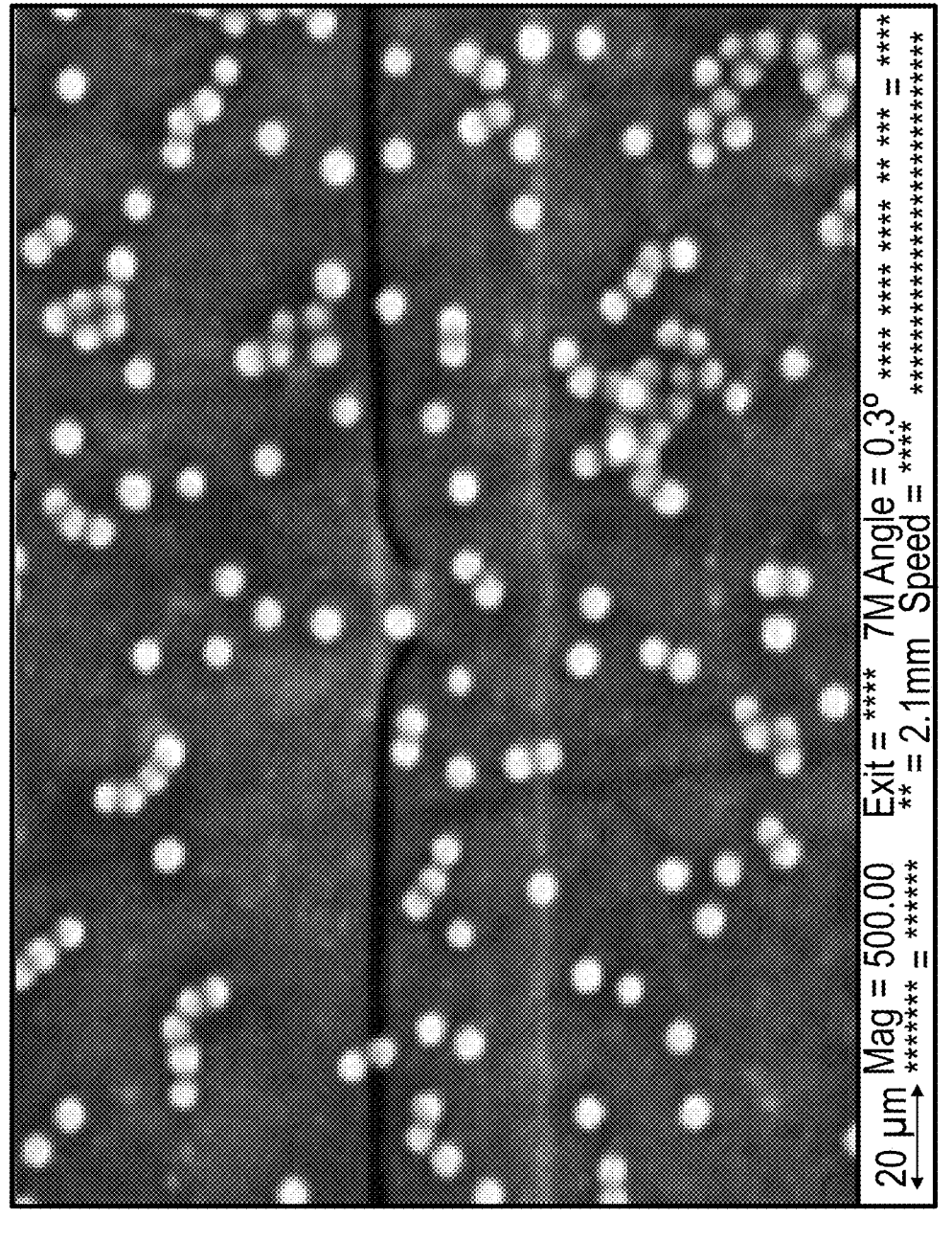
FIG. 5 is a plane view scanning electron microscopy (SEM) image of an exemplary magnetochemical sensor with a plurality of magnetic particles.

In conventional systems, magnetic particles 102 tend to settle randomly on the surface of a detection device. To illustrate, FIG. 5 is a plane view scanning electron microscopy (SEM) image of an exemplary magnetochemical sensor 105 that is an MTJ with a diameter in the x-y plane of approximately 40 nm$^2$ with a plurality of magnetic particles 102 present (appearing as white dots). In FIG. 5, the junction area is parallel to the x-y plane, and the tunneling current flows in the z-axis direction (out of the page or into the page). As shown by the SEM image of FIG. 5, the magnetic particles 102 tend to be distributed randomly across the surface of the detection device in which the magnetochemical sensor 105 is situated. As a result, it is unlikely that any magnetic particle 102 happens to be close enough to the magnetochemical sensor 105 to be detected successfully or reliably.

To illustrate, FIGS. 6A, 6B, 6C, and 6D show four example random distributions of ten magnetic particles 102 across an approximately 200 nm×200 nm surface of a detection device that includes a magnetochemical sensor 105, shown with its center at a position of (100 nm, 100 nm). With the same assumptions made above in the discussions of FIGS. 3B, 3C, and 4, despite a relatively high density of magnetic particles 102 over the surface of the detection device, only the distribution shown in FIG. 6C would be likely to result in a positive detection, assuming the center of the magnetochemical sensor 105 is at the coordinates (100 nm, 100 nm). Because an objective is for the magnetochemical sensor 105 to detect the presence of a single magnetic particle 102, it would be desirable to increase the likelihood that a magnetic particle 102 is situated directly over or very close to the magnetochemical sensor 105.

Various approaches have been proposed to attract the magnetic particle 102 to the area in a detection device that is close (or close enough) to the magnetochemical sensor 105. For example, a surface of the detection device near the magnetochemical sensor 105 can be functionalized using a suitable chemistry to draw particles closer to the magnetochemical sensor 105. Some such approaches have been described in U.S. patent application Ser. No. 17/649,249, filed Jan. 28, 2022 and entitled "SELF-ALIGNED SURFACE MODIFICATION FOR MAGNETOCHEMICAL SENSORS," which is hereby incorporated by reference in its entirety for all purposes. Another approach to attract the magnetic particle 102 closer to the magnetochemical sensor 105 is to use an applied magnetic field to draw the magnetic particle 102 toward the magnetochemical sensor 105. The use of an applied magnetic field to draw the magnetic particle 102 toward the magnetochemical sensor 105 is described in U.S. patent application Ser. No. 16/823,592, filed Mar. 19, 2020 and entitled "MAGNETIC GRADIENT CONCENTRATOR/RELUCTANCE DETECTOR FOR MOLECULE DETECTION," which published as U.S. Patent Application Publication No. US2021/0156851 and is hereby incorporated by reference in its entirety for all purposes.

The present disclosure describes additional approaches. Specifically, disclosed herein are detection devices and systems that include a current-carrying structure to draw magnetic particles 102 closer to a magnetochemical sensor 105. The current-carrying structure is a single, undivided structure situated near (e.g., over, laterally displaced from but close to, etc.) the magnetochemical sensor 105 such that a current through the current-carrying structure creates a magnetic field that attracts the magnetic particle 102 and brings it closer to the sensitive area of the magnetochemical sensor 105.

Figure 7A:
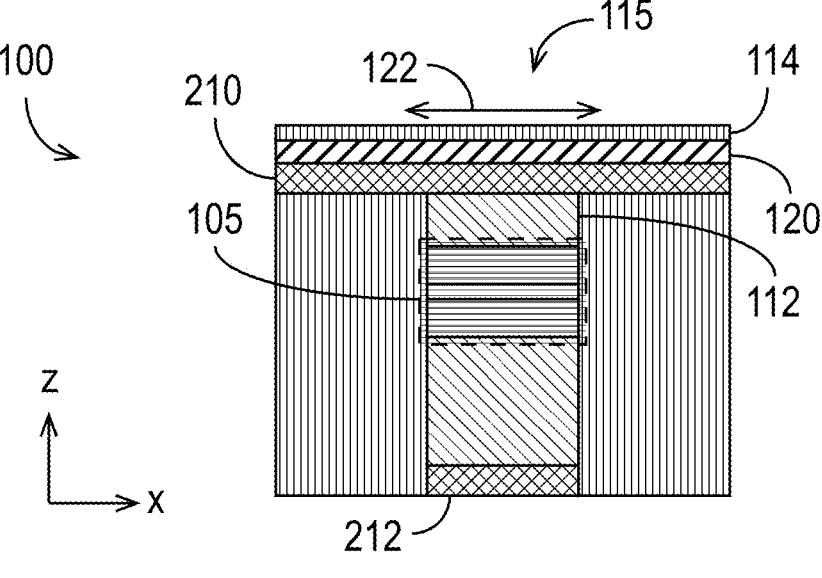
FIG. 7A illustrates portions of an example of a detection device in accordance with some embodiments.

FIG. 7A illustrates portions of an example of a detection device 100 in accordance with some embodiments. The detection device 100 of FIG. 7A includes a magnetochemical sensor 105, a layer 112, an upper electrode 210, and a protective material 114 as previously described. In the example of FIG. 7A, the magnetochemical sensor 105 is illustrated as having the three layers previously described (e.g., ferromagnetic layer 106A, nonmagnetic spacer layer 107, and ferromagnetic layer 106B), although the individual layers are not labeled in FIG. 7A.

The detection device 100 example in FIG. 7A also includes a lower electrode 212, which is situated below bottom surface 108 of the magnetochemical sensor 105. The lower electrode 212 can have properties that are similar or identical to those of the upper electrode 210, described above. Together, the upper electrode 210 and lower electrode 212 can be used to read the magnetochemical sensor 105 to determine whether the magnetochemical sensor 105 has detected (or not detected) a magnetic particle 102.

The detection device 100 shown in FIG. 7A also includes a fluid region 115. In some embodiments, the fluid region 115 is configured to hold or be exposed to (e.g., dipped into) fluids containing molecules to be detected and magnetic particles 102 that may be coupled to the molecules to be detected. The fluid region 115 can have any suitable form. For example, it can be or comprise a microwell, a channel, etc.

The detection device 100 example shown in FIG. 7A also includes a current-carrying structure 120. The current-carrying structure 120 can take any of a variety of forms, as described further below.

In the example shown in FIG. 7A, the current-carrying structure 120 is situated over the upper electrode 210. As explained further below, the current-carrying structure 120 may be in contact with the upper electrode 210 or it may be separated from it. For example, the current-carrying structure 120 can be situated on a layer of material over the upper electrode 210, or it can be suspended over the upper electrode 210. When a current passes through the current-carrying structure 120 in either direction indicated by the current direction arrow 122, a circular magnetic field is created around the current-carrying structure 120 (around the x-axis), and this magnetic field draws magnetic particles 102 in the fluid region 115 toward the current-carrying structure 120 and, therefore, to positions closer to the magnetochemical sensor 105.

Although FIG. 7A shows the current-carrying structure 120 and the upper electrode 210 without any material or structure situated between them, it is to be appreciated that the current-carrying structure 120 and upper electrode 210 may be separated from each other by, for example, a layer of insulating or dielectric material. Furthermore, although the upper electrode 210 and current-carrying structure 120 are illustrated in FIG. 7A as being separate components, they can be one and the same, as further described below. Additionally, the current-carrying structure 120 can be separated from the upper electrode 210. For example, the current-carrying structure 120 can be a free-standing wire tensioned across the fluid region 115 of a chip containing the magnetochemical sensor 105.

Figure 7B:
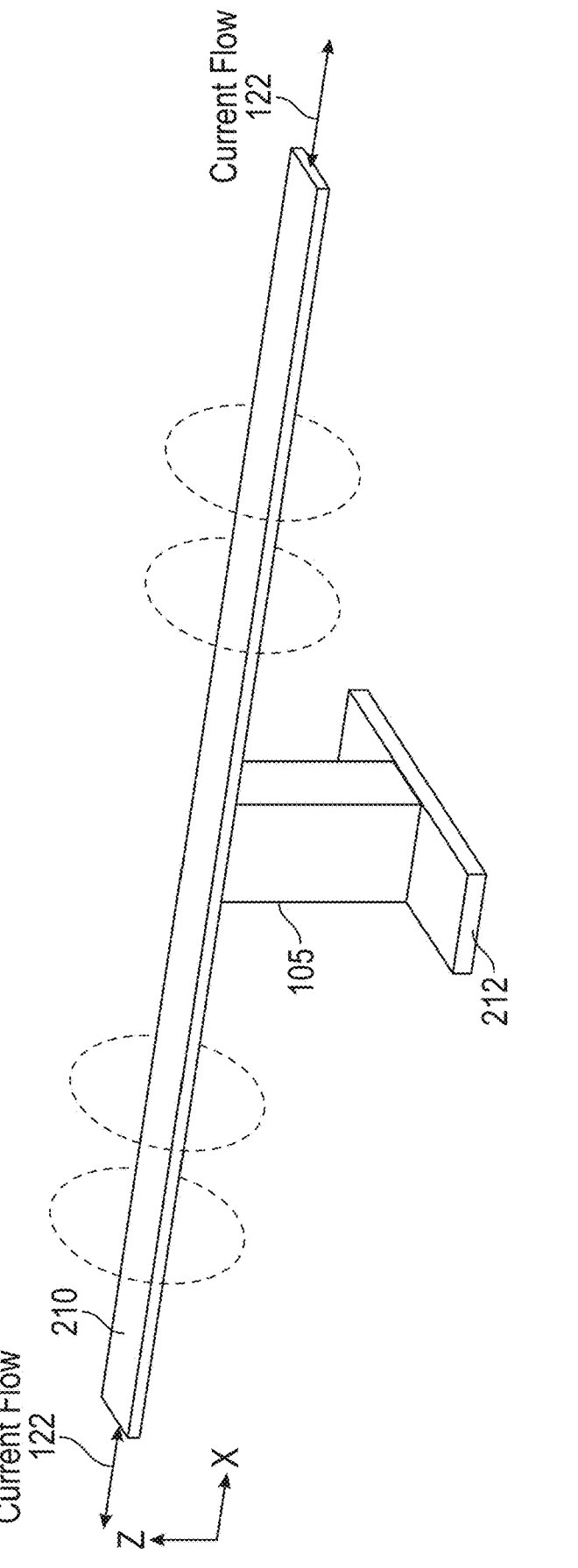
FIG. 7B illustrates portions of an example embodiment in which the upper electrode and the current-carrying structure are one and the same in accordance with some embodiments.

FIG. 7B illustrates portions of an example embodiment in which the upper electrode 210 and the current-carrying structure 120 are one and the same in accordance with some embodiments. As shown, the upper electrode 210 serves as the current-carrying structure 120, potentially in conjunction with the magnetochemical sensor 105 itself. Current passing through the upper electrode 210 creates a circular magnetic field (around the x-axis as illustrated by the dashed circles) that draws magnetic particles 102 in the fluid region 115 (which may be situated above the upper electrode 210 as shown in FIG. 7B) toward the magnetochemical sensor 105. As will be appreciated by those having ordinary skill in the art, the direction of the magnetic field depends on the direction of the current flow. As FIG. 7B illustrates, the current can flow in the positive-x direction, in the negative-x direction, or in both directions. As discussed further below, the current direction may change during operation, thus changing the direction of the magnetic field as well. Thus, and as explained further below, the upper electrode 210 can be used both to read the magnetochemical sensor 105 and as a current-carrying structure 120 to draw magnetic particles 102 toward the magnetochemical sensor 105. It will be appreciated by those having ordinary skill in the art that when the upper electrode 210 is used both as a current-carrying structure 120 and the upper electrode 210, it can be thicker and/or wider than it would be if only serving as an upper electrode 210.

Figure 7C:
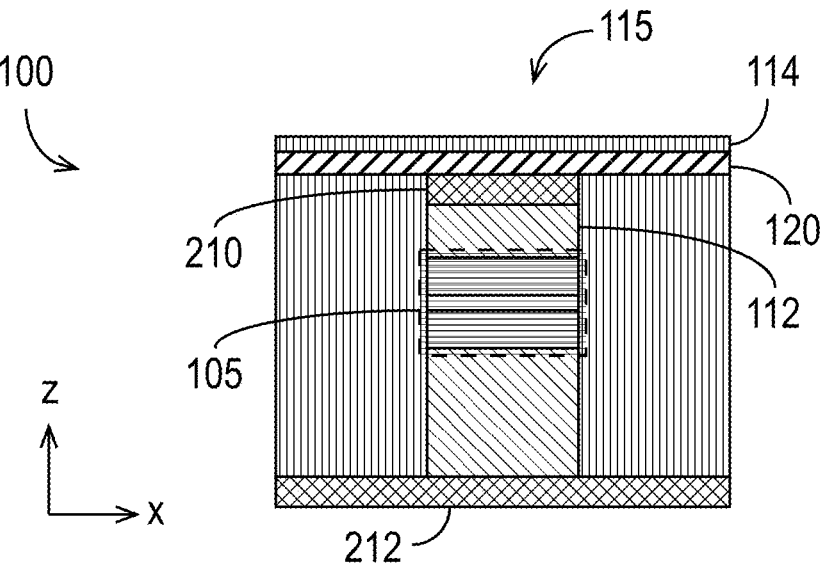
FIG. 7C illustrates portions of another example of a detection device in accordance with some embodiments.

FIG. 7C illustrates portions of another example of a detection device 100 in accordance with some embodiments. Like the detection device 100 of FIG. 7A, the detection device 100 example in FIG. 7C includes a magnetochemical sensor 105, a layer 112, an upper electrode 210, a protective material 114, a lower electrode 212, and a fluid region 115 as previously described. The detection device 100 example shown in FIG. 7C also includes a current-carrying structure 120, which, as noted above, can take any of a variety of forms, as described further below.

In the example shown in FIG. 7C, the current-carrying structure 120 is situated over the upper electrode 210 but extends beyond it in the x-direction. This type of configuration could arise, for example, in a sensor array of magnetochemical sensors 105 in which the upper electrode 210 is shared by a row (or column) of the sensor array and the lower electrode 212 is shared by the column (or row) in which the illustrated magnetochemical sensor 105 is situated, such that the magnetochemical sensor 105 is situated at the "intersection" of the upper electrode 210 and the lower electrode 212. When a current passes through the current-carrying structure 120 shown in FIG. 7C (e.g., in the x-direction), a circular magnetic field is created around the current-carrying structure 120 (around the x-axis), and this magnetic field draws the magnetic particle 102 in the fluid region 115 toward the current-carrying structure 120 and, therefore, to a position closer to the magnetochemical sensor 105. The current-carrying structure 120 shown in FIG. 7C can have physical characteristics such that the magnetic field created when current passes through it is stronger in the area above the magnetochemical sensor 105 than in areas away from the magnetochemical sensor 105. Although FIG. 7C shows the current-carrying structure 120 and the upper electrode 210 without any material or structure situated between them, it is to be appreciated that the current-carrying structure 120 and upper electrode 210 may be separated from each other by, for example, a layer of insulating or dielectric material.

Figure 7D:
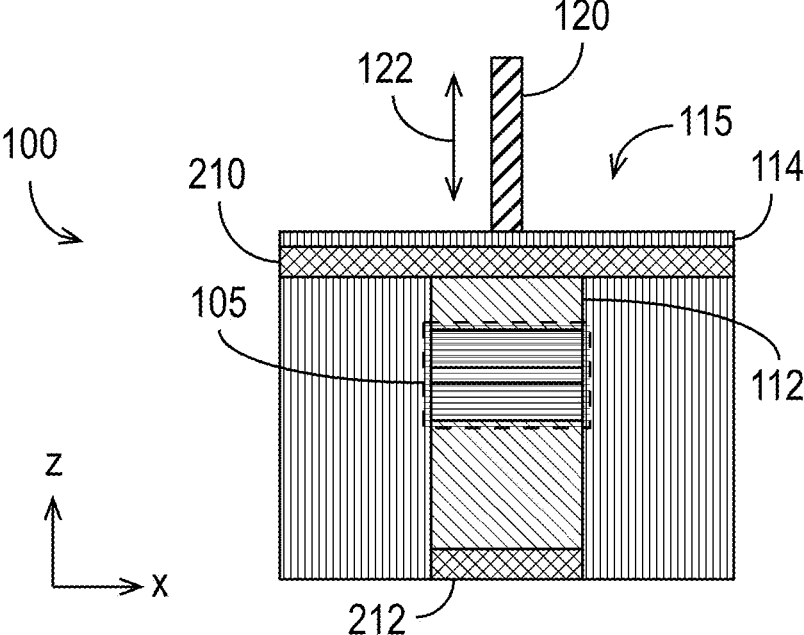
FIG. 7D illustrates portions of another example of a detection device in accordance with some embodiments.

FIG. 7D illustrates portions of another example of a detection device 100 in accordance with some embodiments. Like the detection device 100 of FIG. 7A and the detection device 100 of FIG. 7C, the detection device 100 example in FIG. 7D includes a magnetochemical sensor 105, a layer 112, an upper electrode 210, a protective material 114, a lower electrode 212, and a fluid region 115 as previously described. The detection device 100 shown in FIG. 7D also includes a current-carrying structure 120, which, as noted above, can take any of a variety of forms, as described further below.

In the example shown in FIG. 7D, the current-carrying structure 120 is situated over the upper electrode 210 and extends in the longitudinal direction (shown as the z-direction). Thus, the current-carrying structure 120 shown in FIG.

7D is configured to carry a current in a plane substantially parallel to a longitudinal axis (z-axis) of the magnetochemical sensor 105, potentially in conjunction with the magnetochemical sensor 105 itself. When the current passes through the current-carrying structure 120 in either direction indicated by the current direction arrow 122, a magnetic field is created around the current-carrying structure 120, and this magnetic field draws the magnetic particle 102 in the fluid region 115 toward the current-carrying structure 120 and, therefore, to a position closer to the magnetochemical sensor 105. Although FIG. 7D shows the current-carrying structure 120 separated from the upper electrode 210 by a protective material 114, it is to be appreciated that the current-carrying structure 120 may be in contact with the upper electrode 210 and/or the magnetochemical sensor 105. For example, the current-carrying structure 120 can extend from the magnetochemical sensor 105 and/or the upper electrode 210.

In the examples shown in FIGS. 7A and 7B the current-carrying structure 120 is configured to carry current in a plane that is substantially parallel to an in-plane axis (in an x-y plane, and in the x-direction in the figures) of the magnetochemical sensor 105. In the example shown in FIG. 7D, the current-carrying structure 120 is configured to carry current in a plane that is substantially parallel to a longitudinal axis (perpendicular to the x-y plane, in the z-direction in the figure) of the magnetochemical sensor 105.

Figure 7E:
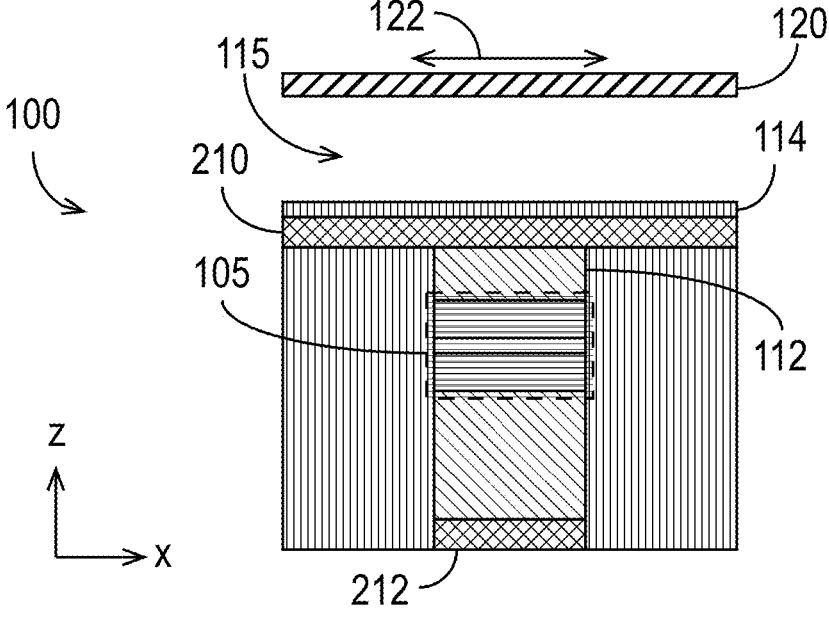
FIG. 7E illustrates portions of another example of a detection device in which the upper electrode and the current-carrying structure are separated in accordance with some embodiments.

FIGS. 7A, 7C, and 7D show the current-carrying structure 120 physically coupled to the upper electrode 210 (either directly or through an intervening component (e.g., the protective material 114)), but there is no requirement for the current-carrying structure 120 to be coupled to the upper electrode 210. FIG. 7E illustrates portions of another example of a detection device 100 in which the upper electrode 210 and the current-carrying structure 120 are separated in accordance with some embodiments. In the configuration shown in FIG. 7E, the current-carrying structure 120 is suspended above the upper electrode 210 and the magnetochemical sensor 105, and the fluid region 115 is the volume between the current-carrying structure 120 and the upper electrode 210. In the example of FIG. 7E, the current-carrying structure 120 may be situated in a removable printed circuit board (PCB) or wafer that can be detached from the detection device 100 (e.g., for cleaning, reuse, etc.). As another example, the fluid region 115 may include volume both between the current-carrying structure 120 and the upper electrode 210 and above the current-carrying structure 120, and the current-carrying structure 120 can be a free-standing mesh so that magnetic particles 102 can move from one side of the current-carrying structure 120 to the other. In such embodiments, the fluid region 115 can extend above the current-carrying structure 120.

It is to be appreciated that FIGS. 7A through 7D show the current-carrying structure 120 above the magnetochemical sensor 105, but there is no requirement for the current-carrying structure 120 to be situated over the magnetochemical sensor 105. For example, the current-carrying structure 120 can be situated in a structure (e.g., a circuit board) that forms a portion (e.g., side, bottom, top, etc.) of the fluid region 115. As used herein, the term "circuit board" refers to any suitable circuit-housing structure (e.g., a laminated sandwich structure of conductive and insulating layers) that can accommodate the current-carrying structure 120 described herein. A circuit board can be rigid or flexible. For example, a circuit board suitable for housing the current-carrying structure 120 described herein can be a flex cable, an interposer (e.g., glass, silicon, etc.), or any other suitable structure that can house a current-carrying structure 120.

The current-carrying structure 120 can be any suitable structure (e.g., a wire, a trace, a via of a printed circuit board, etc.) made from any suitable material or combination of materials (e.g., a conductive metal such as, for example, copper, iron, gold, aluminum, silver, etc.), and it can have any suitable shape. FIGS. 8A, 8B, 8C, 8D, 8E, and 8F illustrate several examples of shapes of current-carrying structures 120, with a magnetochemical sensor 105 shown for reference. The illustrated magnetochemical sensor 105 is shown as having a circular shape when viewed from an x-y plane, but it is to be appreciated that, as explained above, the magnetochemical sensor 105 can have any suitable size and shape. It is also to be appreciated that although FIGS. 8A through 8F illustrate the current-carrying structure 120 as though it carries current in an x-y plane (a plane substantially parallel to an in-plane axis, e.g., FIGS. 7A and 7B), the example current-carrying structure 120 can alternatively be used to carry current in a longitudinal direction (in a plane substantially parallel to a longitudinal axis of the magnetochemical sensor 105, e.g., FIG. 7D). It will be appreciated that certain embodiments of the current-carrying structure 120 may be more or less advantageous for particular configurations of the magnetochemical sensor 105.

Figure 8A:
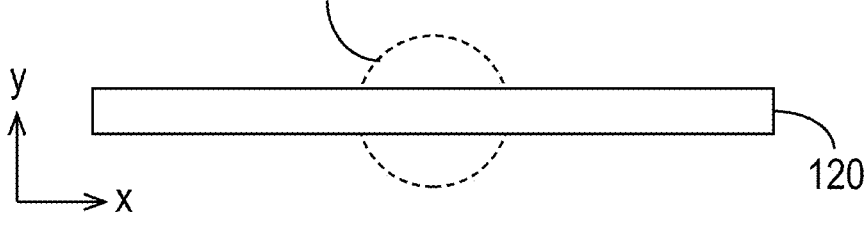
FIGS. 8A, 8B, 8C, 8D, 8E, and 8F illustrate examples of current-carrying structures.

FIG. 8A illustrates an example of a current-carrying structure 120 that has a uniform width in the x-y plane. The current-carrying structure 120 shown in FIG. 8A could be, for example, a wire or a trace of a printed circuit board. As will be appreciated by those having ordinary skill in the art, the current density in the current-carrying structure 120 in FIG. 8A will be substantially uniform in the x-direction, and the magnitude of the magnetic field generated around the x-axis by the current will also be substantially uniform.

Figure 8B:
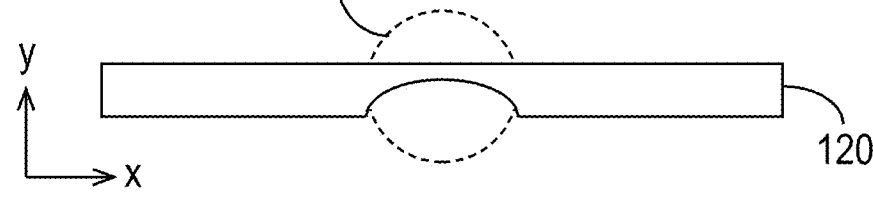

FIG. 8B illustrates another example of a current-carrying structure 120. As shown, the current-carrying structure 120 has a non-uniform width in the x-y plane. Specifically, in the example of FIG. 8B, the current-carrying structure 120 is narrower over the magnetochemical sensor 105 than it is elsewhere. The current-carrying structure 120 has a curvature in the portion of it that resides over the magnetochemical sensor 105. Assuming that the thickness of the current-carrying structure 120 of FIG. 8B (in the z-direction) is substantially uniform (which is not a requirement), the current density in the current-carrying structure 120, and therefore the magnetic field magnitude, will be higher over the magnetochemical sensor 105 than away from it.

Figure 8C:
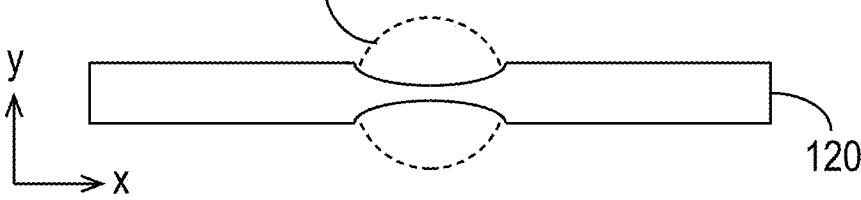

FIG. 8C illustrates another example of a current-carrying structure 120. Like the current-carrying structure 120 shown in FIG. 8B, the current-carrying structure 120 in FIG. 8C has a non-uniform width in the x-y plane. Specifically, in the example of FIG. 8C, the current-carrying structure 120 is narrower over the magnetochemical sensor 105 than it is elsewhere. The current-carrying structure 120 has a curvature in the portion that resides over the magnetochemical sensor 105. The current-carrying structure 120 shown in FIG. 8C has a shape that can be referred to as a curved bow-tie shape. Again, assuming that the thickness of the current-carrying structure 120 of FIG. 8C (in the z-direction) is substantially uniform (which is not a requirement), the current density in the current-carrying structure 120, and therefore the magnetic field magnitude, will be higher over the magnetochemical sensor 105 than away from it.

Figure 8D:
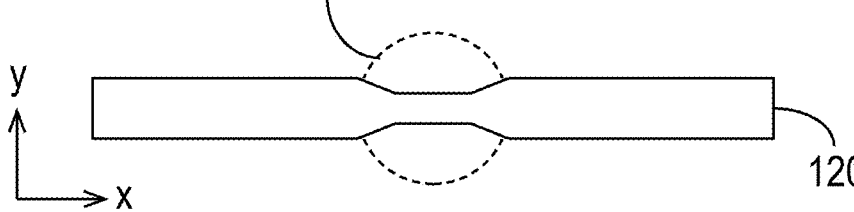

FIG. 8D illustrates another example of a current-carrying structure 120. As shown, the current-carrying structure 120 also has a non-uniform width in the x-y plane. As in FIGS. 8B and 8C, in the example of FIG. 8D, the current-carrying structure 120 is narrower over the magnetochemical sensor 105 than it is elsewhere. The current-carrying structure 120 shown in FIG. 8D has a shape that can be referred to as a linear bow-tie shape. As for the current-carrying structures 120 in FIGS. 8B and 8C, assuming that the thickness of the current-carrying structure 120 of FIG. 8D (in the z-direction) is substantially uniform (which is not a requirement), the current density in the current-carrying structure 120, and therefore the magnetic field magnitude, will be higher over the magnetochemical sensor 105 than away from it.

Figure 8E:
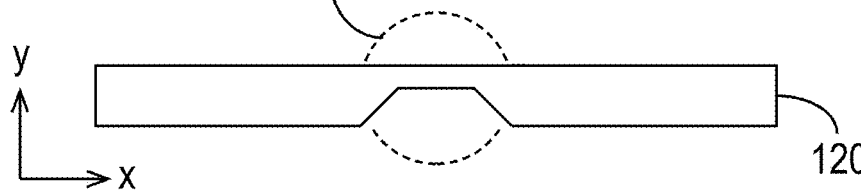

FIG. 8E illustrates another example of a current-carrying structure 120. As shown, the current-carrying structure 120 shown in FIG. 8E also has a non-uniform width in the x-y plane. As in the examples of FIGS. 8B through 8D, in the example of FIG. 8E, the current-carrying structure 120 is narrower over the magnetochemical sensor 105 than it is elsewhere. The current-carrying structure 120 has a linear narrowed region in the portion that resides over the magnetochemical sensor 105. Again, assuming that the thickness of the current-carrying structure 120 of FIG. 8E (in the z-direction) is substantially uniform (which is not a requirement), the current density in the current-carrying structure 120, and therefore the magnetic field magnitude, will be higher over the magnetochemical sensor 105 than away from it.

Figure 8F:
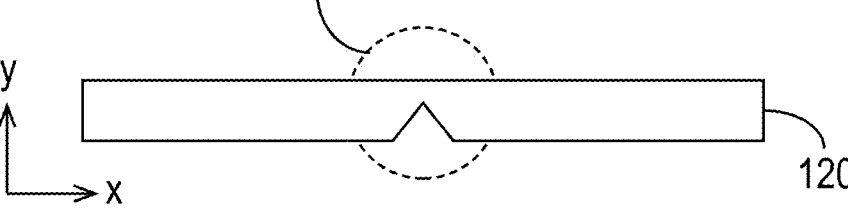

FIG. 8F illustrates another example of a current-carrying structure 120. As shown, the current-carrying structure 120 shown in FIG. 8F also has a non-uniform width in the x-y plane. As in the examples of FIGS. 8B through 8E, in the example of FIG. 8F, the current-carrying structure 120 is narrower over the magnetochemical sensor 105 than it is elsewhere. The current-carrying structure 120 has a notched region in the portion that resides over the magnetochemical sensor 105. Again, assuming that the thickness of the current-carrying structure 120 of FIG. 8F (in the z-direction) is substantially uniform (which is not a requirement), the current density in the current-carrying structure 120, and therefore the magnetic field magnitude, will be higher over the magnetochemical sensor 105 than away from it.

The minimum width of the current-carrying structure 120 in any of FIGS. 8B through 8F (in the y-direction, using the axes shown) can be, for example, less than or equal to about 5 nm, and the maximum width can be, for example, greater than or equal to about 50 μm. The current-carrying structure 120 shown in any of FIGS. 8B through 8F can be, for example, a trace of a printed circuit board.

In each of FIGS. 8A through 8F, the current-carrying structure 120 consists of a single, undivided structure. In other words, the current-carrying structure 120 is only one contiguous structure (as opposed to, for example, two structures, such as two wires).

The examples shown in FIGS. 8A through 8F are merely examples of forms of the current-carrying structure 120 and are not meant to be limiting. The current-carrying structure 120 can have any suitable size, shape, thickness, width, non-uniformity, etc., and it can be made from any material (s), that allow it to carry a current that causes a sufficient magnetic field to be created to draw the magnetic particle 102 toward the magnetochemical sensor 105.

As stated above, there is no requirement for the thickness of the current-carrying structure 120 to be uniform in the z-direction. As one example, it will be appreciated in light of the disclosures herein that the current-carrying structure 120 could be thinner over the magnetochemical sensor 105 to further increase the current density over the current-carrying structure 120 and thereby provide an even higher magnetic field magnitude. Like the width of the current-carrying structure 120, the thickness of the current-carrying structure 120 can be uniform or non-uniform. Thus, a current-carrying structure 120 can have (a) a uniform width and a uniform thickness; (b) a uniform width and non-uniform thickness; (c) a non-uniform width and a uniform thickness; or (d) a non-uniform width and a non-uniform thickness.

FIGS. 8G through 8L illustrate several examples of current-carrying structures 120 with non-uniform thicknesses (in the z-direction), with a magnetochemical sensor 105 shown below the current-carrying structure 120 for reference. The illustrated magnetochemical sensor 105 is shown as having a rectangular shape when viewed from an x-z plane, but it is to be appreciated that, as explained above, the magnetochemical sensor 105 can have any suitable size and shape. It is also to be appreciated that although FIGS. 8G through 8L illustrate the current-carrying structure 120 as though it carries current in the x-direction, the example current-carrying structure 120 can alternatively be used to carry current in a longitudinal direction (in a plane substantially parallel to a longitudinal axis of the magnetochemical sensor 105, e.g., FIG. 7D). It will be appreciated that certain embodiments of the current-carrying structure 120 may be more or less advantageous for particular configurations of the magnetochemical sensor 105.

Figure 8G:
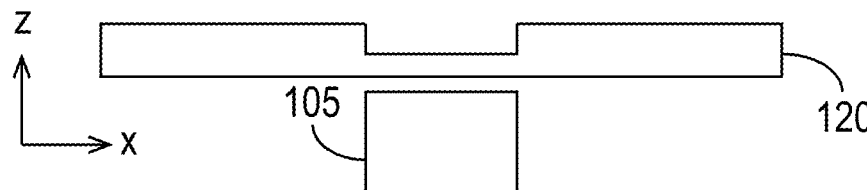
FIGS. 8G, 8H, 8I, 8J, 8K, and 8L illustrate examples of current-carrying structures with non-uniform thicknesses.

FIG. 8G illustrates an example of a current-carrying structure 120 that has a non-uniform thickness. In particular, the current-carrying structure 120 example shown in FIG. 8G is thinner over the magnetochemical sensor 105 than elsewhere. The current-carrying structure 120 shown in FIG. 8A could be, for example, a metal layer of a chip with a trench created over the magnetochemical sensor 105 during the manufacturing process (e.g., by depositing a conductive layer, applying a photoresist mask, and removing material from over the magnetochemical sensor 105 while the photoresist mask is in place). As will be appreciated by those having ordinary skill in the art, the current density in the current-carrying structure 120 in FIG. 8G will be greater over the magnetochemical sensor 105 than elsewhere.

Figure 8H:
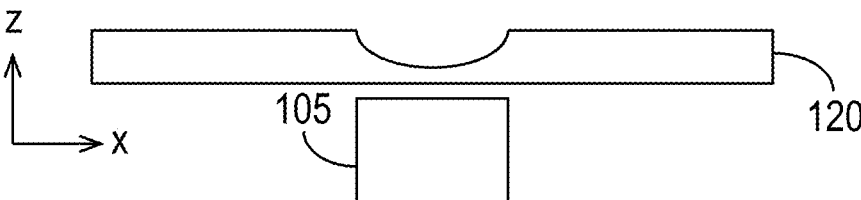

FIG. 8H illustrates another example of a current-carrying structure 120 that has a non-uniform thickness. Specifically, in the example of FIG. 8H, the current-carrying structure 120 is thinner over the magnetochemical sensor 105 than it is elsewhere. The current-carrying structure 120 has a curvature in the portion of it that resides over the magnetochemical sensor 105. Assuming that the width of the current-carrying structure 120 of FIG. 8B (in the x-y plane) is substantially uniform (which, as discussed above, is not a requirement), the current density in the current-carrying structure 120, and therefore the magnetic field magnitude, will be higher over the magnetochemical sensor 105 than away from it. It will be appreciated that the current-carrying structure 120 example shown in FIG. 8H can be fabricated similarly to the one shown in FIG. 8G (e.g., by depositing material (e.g., a metal layer) over the magnetochemical sensor 105, applying a photoresist mask, and removing material from over the magnetochemical sensor 105).

Figure 8I:
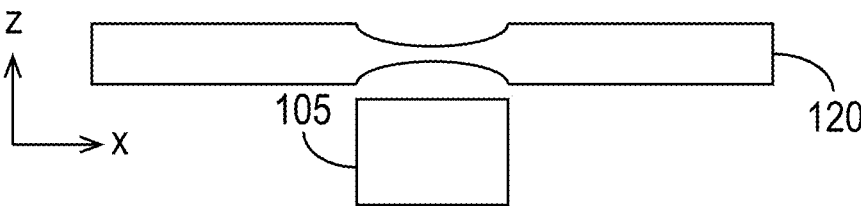

FIG. 8I illustrates another example of a current-carrying structure 120. Like the current-carrying structures 120 shown in FIG. 8G and FIG. 8H, the current-carrying structure 120 in FIG. 8I has a non-uniform thickness (in the z-direction). Specifically, in the example of FIG. 8I, the current-carrying structure 120 is thinner over the magnetochemical sensor 105 than it is elsewhere. The current-carrying structure 120 has a curvature in the portion that resides over the magnetochemical sensor 105. The current-carrying structure 120 shown in FIG. 8I has a shape that can be referred to as a curved bow-tie shape. Again, assuming that the width of the current-carrying structure 120 of FIG. 8I (in the x-y plane) is substantially uniform (which, as explained above, is not a requirement), the current density in the current-carrying structure 120, and therefore the magnetic field magnitude, will be higher over the magnetochemical sensor 105 than away from it. The current-carrying structure 120 example shown in FIG. 8I could be fabricated as a separate structure using a process that allows the bow-tie shape to be created in the z-direction.

Figure 8J:
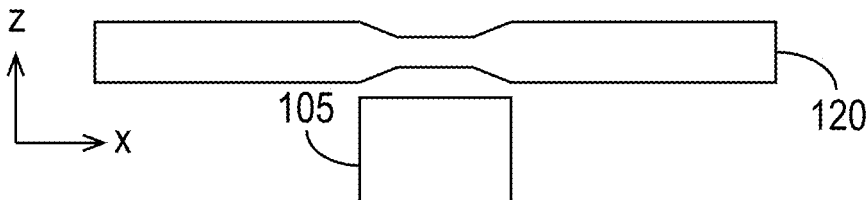

FIG. 8J illustrates another example of a current-carrying structure 120. As shown, the current-carrying structure 120 also has a non-uniform thickness (in the z-direction). As in FIGS. 8G through 8I, in the example of FIG. 8J, the current-carrying structure 120 is thinner over the magnetochemical sensor 105 than it is elsewhere. The current-carrying structure 120 shown in FIG. 8J has a shape that can be referred to as a linear bow-tie shape. As for the current-carrying structures 120 in FIGS. 8G through 8I, assuming that the width of the current-carrying structure 120 of FIG. 8J (in the x-y plane) is substantially uniform (which, as explained above, is not a requirement), the current density in the current-carrying structure 120, and therefore the magnetic field magnitude, will be higher over the magnetochemical sensor 105 than away from it.

Figure 8K:
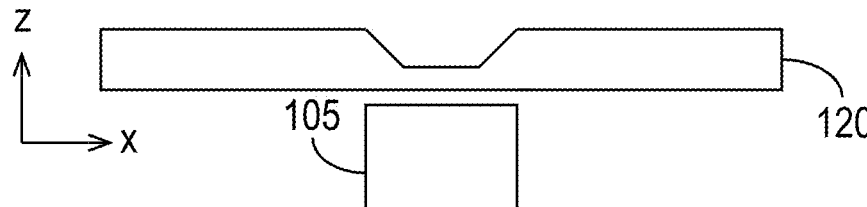

FIG. 8K illustrates another example of a current-carrying structure 120. As shown, the current-carrying structure 120 shown in FIG. 8K also has a non-uniform thickness (in the z-direction). As in the examples of FIGS. 8G through 8J, in the example of FIG. 8K, the current-carrying structure 120 is thinner over the magnetochemical sensor 105 than it is elsewhere. The current-carrying structure 120 has a linear narrowed region in the portion that resides over the magnetochemical sensor 105. Again, assuming that the width of the current-carrying structure 120 of FIG. 8K (in the x-y plane) is substantially uniform (which, as explained above, is not a requirement), the current density in the current-carrying structure 120, and therefore the magnetic field magnitude, will be higher over the magnetochemical sensor 105 than away from it.

Figure 8L:
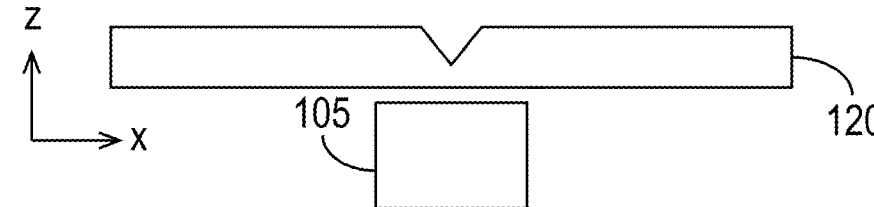

FIG. 8L illustrates another example of a current-carrying structure 120. As shown, the current-carrying structure 120 shown in FIG. 8L also has a non-uniform thickness (in the z-direction). As in the examples of FIGS. 8G through 8K, in the example of FIG. 8L, the current-carrying structure 120 is thinner over the magnetochemical sensor 105 than it is elsewhere. The current-carrying structure 120 has a notched region in the portion that resides over the magnetochemical sensor 105. Again, assuming that the width of the current-carrying structure 120 of FIG. 8L (in the x-y plane) is substantially uniform (which, as explained above, is not a requirement), the current density in the current-carrying structure 120, and therefore the magnetic field magnitude, will be higher over the magnetochemical sensor 105 than away from it.

The minimum thickness of the current-carrying structure 120 in any of FIGS. 8G through 8L (in the z-direction, using the axes shown) can be, for example, less than or equal to about 5 nm, and the maximum thickness can be, for example, greater than or equal to about 50 μm. The current-carrying structure 120 shown in any of FIGS. 8G through 8L can be, for example, a trace of a printed circuit board.

In each of FIGS. 8G through 8L, the current-carrying structure 120 consists of a single, undivided structure. In other words, the current-carrying structure 120 is only one contiguous structure (as opposed to, for example, two structures, such as two wires).

The examples shown in FIGS. 8G through 8L are merely examples of forms of the current-carrying structure 120 and are not meant to be limiting. The current-carrying structure 120 can have any suitable size, shape, thickness, width, non-uniformity, etc., and it can be made from any material (s), that allow it to carry a current that causes a sufficient magnetic field to be created to draw the magnetic particle 102 toward the magnetochemical sensor 105.

In some embodiments, the detection device 100 includes a plurality of magnetochemical sensors 105, which may be arranged in a sensor array 110. The sensor array 110 can have any suitable number of magnetochemical sensors 105 arranged in any suitable pattern. For example, the sensor array 110 can be a linear array. In some embodiments, the magnetochemical sensors 105 in the sensor array 110 are magnetoresistive (MR) sensors that can detect, for example, a magnetic field or a resistance, a change in magnetic field or a change in resistance, an oscillation frequency, a change in oscillation frequency, a noise level, a change in noise level, or any other characteristic that can be used to detect the presence or absence of a magnetic particle 102. In some embodiments, each of the magnetochemical sensors 105 of the sensor array 110 is a thin film device that uses the MR effect to detect magnetic particles 102. The magnetochemical sensors 105 may operate as potentiometers with a resistance that varies as the strength and/or direction of the sensed magnetic field changes. In some embodiments, the magnetochemical sensors 105 comprise a magnetic oscillator (e.g., a spin-torque oscillator (STO)), and the characteristic that indicates whether at least one label is detected is a frequency of a signal associated with or generated by the magnetic oscillator, or a change in the frequency of the signal.

Figure 9A:
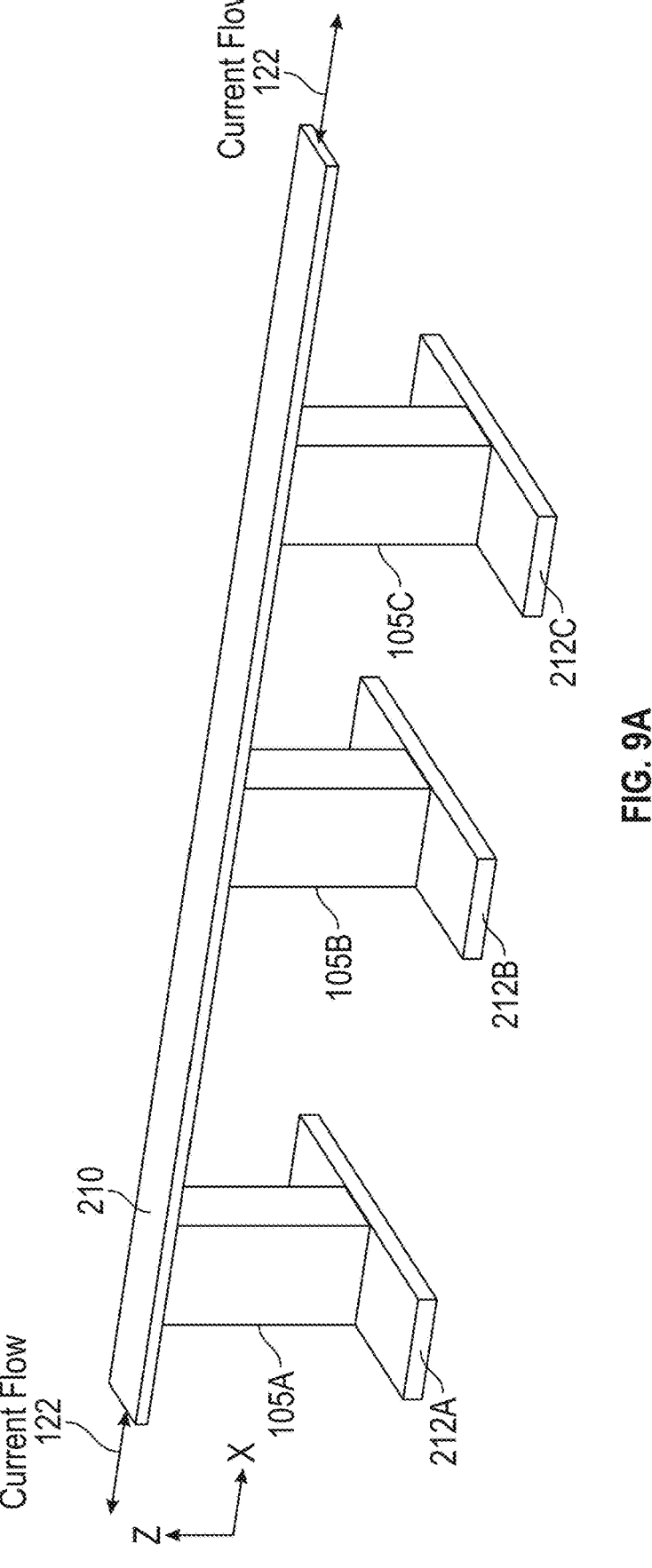
FIG. 9A illustrates an example of a magnetochemical sensor array with a current-carrying structure.

FIG. 9A illustrates an example of a sensor array 110 of magnetochemical sensor 105 that is a linear array. The sensor array 110 example shown in FIG. 9A includes the magnetochemical sensor 105A, the magnetochemical sensor 105B, and the magnetochemical sensor 105C. Each of the magnetochemical sensors 105 is coupled to a respective lower electrode 212. As shown, the magnetochemical sensor 105A is coupled to the lower electrode 212A, the magnetochemical sensor 105B is coupled to the lower electrode 212B, and the magnetochemical sensor 105C is coupled to the lower electrode 212C. The upper electrode 210 and lower electrode 212A can be used to read the magnetochemical sensor 105A; the upper electrode 210 and the lower electrode 212B can be used to read the magnetochemical sensor 105B; and the upper electrode 210 and the lower electrode 212C can be used to read the magnetochemical sensor 105C. The upper electrode 210, which, in conjunction with the lower electrode 212A, lower electrode 212B, and lower electrode 212C can be used to read, respectively, each of the magnetochemical sensor 105A, magnetochemical sensor 105B, and magnetochemical sensor 105C, serves as the current-carrying structure 120 as described above in the discussion of FIG. 7B.

Figure 9B:
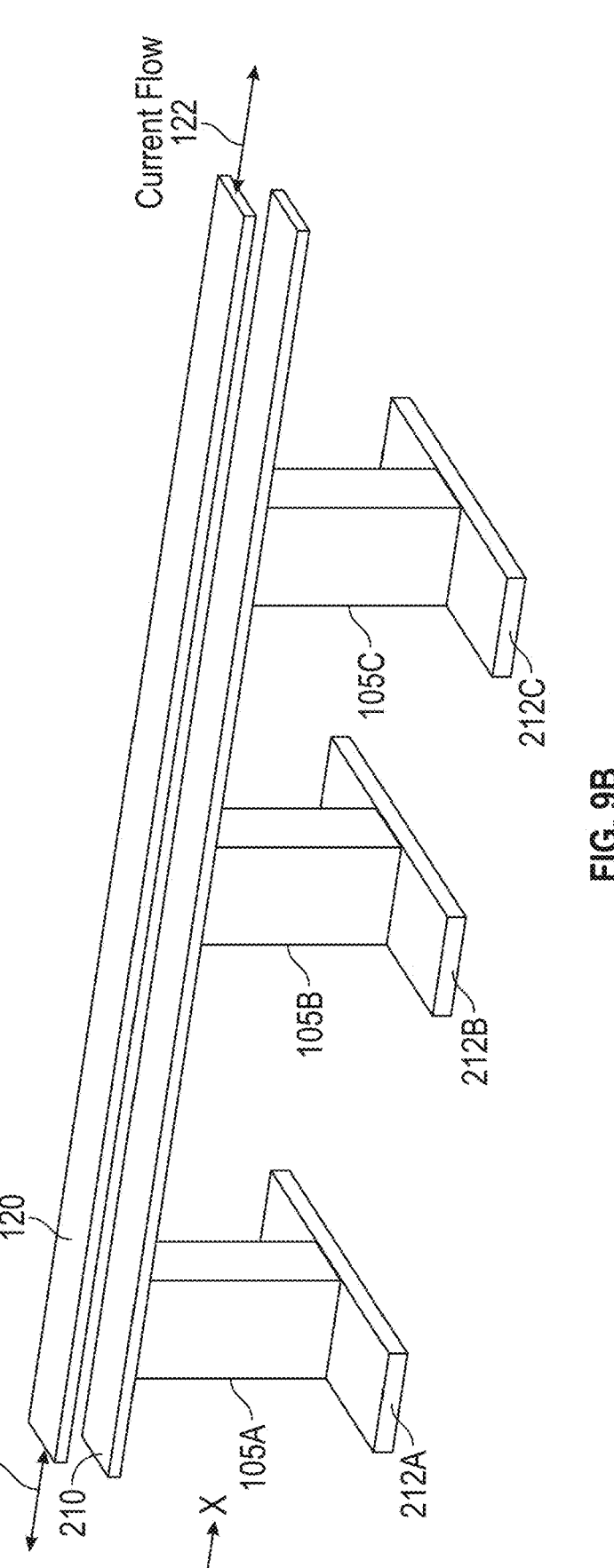
FIG. 9B illustrates another example of a magnetochemical sensor array with a current-carrying structure.

FIG. 9B illustrates another example of a sensor array 110 that is a linear array. The sensor array 110 example shown in FIG. 9B includes the magnetochemical sensor 105A, the magnetochemical sensor 105B, and the magnetochemical sensor 105C. Each of the magnetochemical sensors 105 is coupled to a respective lower electrode 212. As shown, the magnetochemical sensor 105A is coupled to the lower electrode 212A, the magnetochemical sensor 105B is coupled to the lower electrode 212B, and the magneto-chemical sensor 105C is coupled to the lower electrode 212C. The upper electrode 210 and lower electrode 212A can be used to read the magnetochemical sensor 105A; the upper electrode 210 and the lower electrode 212B can be used to read the magnetochemical sensor 105B; and the upper electrode 210 and the lower electrode 212C can be used to read the magnetochemical sensor 105C. As illustrated, a current-carrying structure 120 is situated over the upper electrode 210. Although FIG. 9B does not show any material between the upper electrode 210 and the current-carrying structure 120, as explained above, the upper electrode 210 and the current-carrying structure 120 can be separated by a layer of, for example, an insulator or dielectric. Moreover, although FIG. 9B illustrates the current-carrying structure 120 as having a shape similar or identical to the shape of the upper electrode 210, it is to be appreciated that the current-carrying structure 120 can have any suitable properties to draw magnetic particles 102 toward the magnetochemical sensors 105. For example, the current-carrying structure 120 can comprise multiple instances of one or more of the current-carrying structure 120 examples shown in FIGS. 8B through 8F (e.g., a narrower portion can be situated above each of the magnetochemical sensor 105A, magnetochemical sensor 105B, and magnetochemical sensor 105C).

Figure 9C:
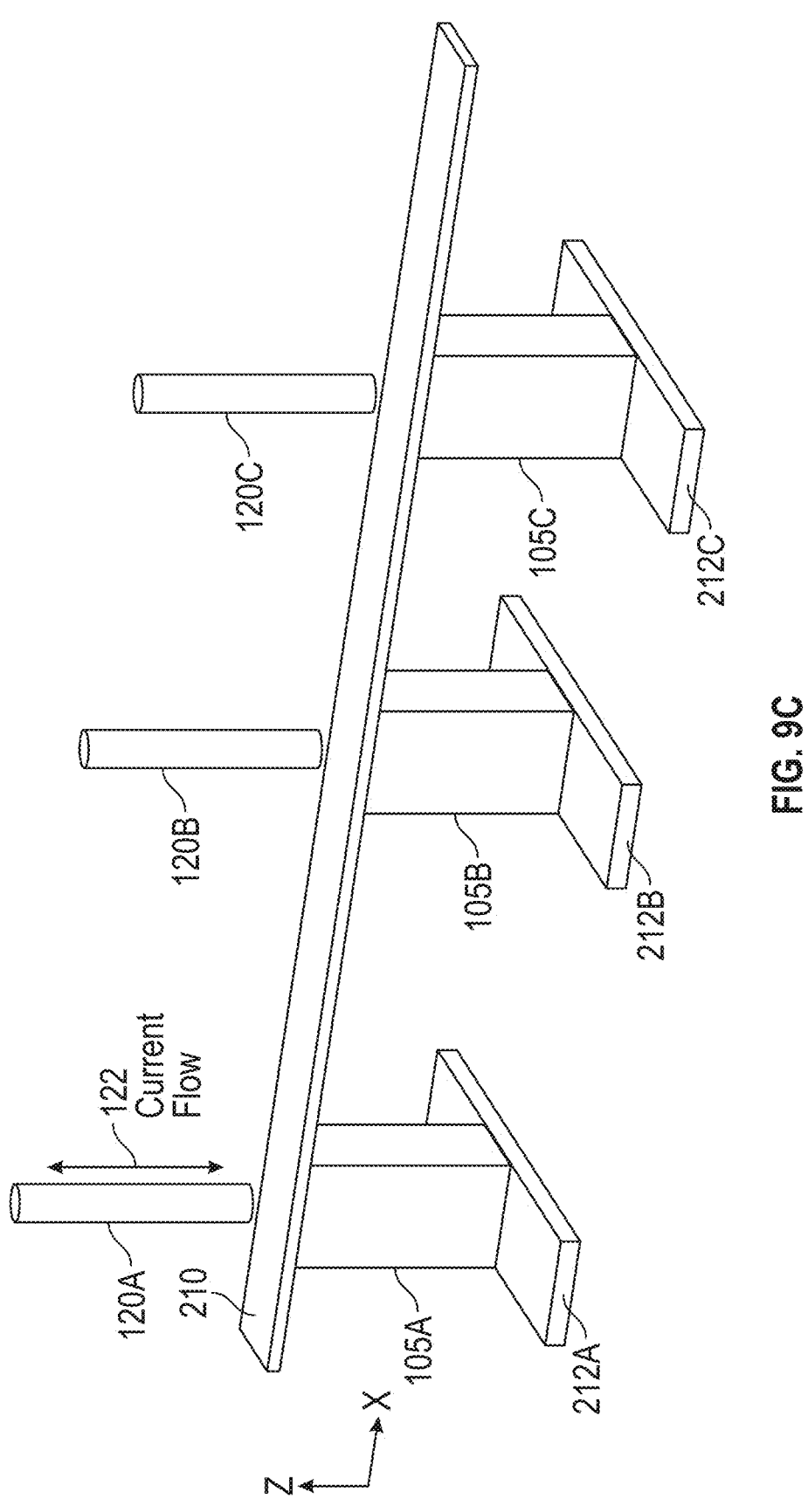
FIG. 9C illustrates another example of a magnetochemical sensor array with a plurality of current-carrying structures.

FIG. 9C illustrates another example of a sensor array 110 that is a linear array. The sensor array 110 example shown in FIG. 9C includes the magnetochemical sensor 105A, the magnetochemical sensor 105B, and the magnetochemical sensor 105C. Each of the magnetochemical sensors 105 is coupled to a respective lower electrode 212. As shown, the magnetochemical sensor 105A is coupled to the lower electrode 212A, the magnetochemical sensor 105B is coupled to the lower electrode 212B, and the magneto-chemical sensor 105C is coupled to the lower electrode 212C. The upper electrode 210 and lower electrode 212A can be used to read the magnetochemical sensor 105A; the upper electrode 210 and the lower electrode 212B can be used to read the magnetochemical sensor 105B; and the upper electrode 210 and the lower electrode 212C can be used to read the magnetochemical sensor 105C. As illustrated, a respective current-carrying structure 120 is situated over each magnetochemical sensor 105. Specifically, the current-carrying structure 120A is situated over the magnetochemical sensor 105A, the current-carrying structure 120B is situated over the magnetochemical sensor 105B, and the current-carrying structure 120C is situated over the magnetochemical sensor 105C. Although FIG. 9C does not show any material between the upper electrode 210 and the current-carrying structures 120, the upper electrode 210 and the current-carrying structure 120A, the current-carrying structure 120B, and the current-carrying structure 120C can be separated by a layer of, for example, an insulator or dielectric.

Although FIGS. 9A and 9B illustrate the current-carrying structure 120 as a structure that has a uniform width in the y-direction, it is to be understood that the current-carrying structure 120 can be any suitable structure with any suitable properties. For example, the current-carrying structure 120 in any of FIGS. 9A through 9C can have a non-uniform width in the x-y plane (e.g., in the y-direction, such as repeated copies of one of the current-carrying structure 120 examples shown in FIGS. 8B through 8F). Moreover, although FIGS. 9A and 9B illustrate a single current-carrying structure 120 for all of the magnetochemical sensor 105A, magnetochemical sensor 105B, and magnetochemical sensor 105C, it is to be understood that each magnetochemical sensor 105 can have a dedicated current-carrying structure 120, which may be coupled to common or dedicated (or partially common and partially dedicated) driver circuitry (e.g., a voltage source, a current source, a switch, etc.).

Similarly, although FIG. 9C illustrates the current-carrying structure 120A, the current-carrying structure 120B, and the current-carrying structure 120C cylindrical structures extending in the z-direction, it is to be understood that the current-carrying structures 120 can be any suitable structure with any suitable properties. For example, the current-carrying structures 120 in FIG. 9C can have a non-uniform width/diameter along the z-axis. Furthermore, the current-carrying structure 120A, the current-carrying structure 120B, and the current-carrying structure 120C can be substantially identical, or they can be different from each other. Moreover, different current-carrying structures 120 may be coupled to common or dedicated (or partially common and partially dedicated) driver circuitry (e.g., a voltage source, a current source, a switch, etc.).

In addition, although FIGS. 9A through 9C illustrate only three magnetochemical sensors 105, it is to be understood that the sensor array 110 can include any number of magnetochemical sensors 105, current-carrying structures 120, etc., in any suitable configuration.

As one example, the sensor array 110 can be a rectangular array having rows and columns of magnetochemical sensors 105. FIG. 10A illustrates portions of an example of a detection device 100 that includes a sensor array 110 of magnetochemical sensors 105 in a rectangular configuration in accordance with some embodiments. FIG. 10A is a top view of the detection device 100. As shown in FIG. 10A, the sensor array 110 includes a plurality of magnetochemical sensors 105, with sixteen magnetochemical sensors 105 shown in the sensor array 110 of FIG. 10A. It is to be appreciated that an implementation of a detection device 100 may include any number of magnetochemical sensors 105 (e.g., hundreds, thousands, etc. of magnetochemical sensors 105). To avoid obscuring the drawing, only seven of the magnetochemical sensors 105 are labeled in FIG. 10A, namely the magnetochemical sensors 105A, 105B, 105C, 105D, 105E, 105F, and 105G. As explained above, the magnetochemical sensors 105 detect the presence or absence of magnetic particles 102. In other words, each of the magnetochemical sensors 105 is configured to detect whether there is at least one magnetic particle 102 in its vicinity.

Each magnetochemical sensor 105 is illustrated in FIG. 10A as having a round shape in the x-y plane. It is to be understood, however, that in general the magnetochemical sensors 105 can have any suitable shape. For example, the magnetochemical sensors 105 may be cylindrical, cuboid, or any other shape in three dimensions. Moreover, different magnetochemical sensors 105 can have different shapes (e.g., some may be cuboid and others cylindrical, etc.). It is to be appreciated that all of the drawings herein are merely exemplary.

As shown in FIG. 10A, the example detection device 100 includes a number of lines 125, which can perform the functions of the electrodes described above (e.g., the upper electrode 210 and the lower electrode 212). In other words, the lines 125 can be or comprise the upper electrode 210 and/or the lower electrode 212. In some embodiments, each of the plurality of magnetochemical sensors 105 is coupled to at least one line 125. In the example shown in FIG. 10A, the detection device 100 includes the line 125A, the line 125B, the line 125C, the line 125D, the line 125E, the line 125F, the line 125G, and the line 125H. (For simplicity, this document refers generally to the lines by the reference number 125. Individual lines are given the reference number 125 followed by a letter.) Pairs of lines 125 can be used to access (e.g., interrogate) individual magnetochemical sensors 105 in the sensor array 110. In the exemplary embodiment shown in FIG. 10A, each magnetochemical sensor 105 of the sensor array 110 is coupled to, and can be read via, two lines 125. For example, the magnetochemical sensor 105A is coupled to the line 125A and line 125H; the magnetochemical sensor 105B is coupled to line 125B and line 125H; the magnetochemical sensor 105C is coupled to line 125C and line 125H; the magnetochemical sensor 105D is coupled to line 125D and line 125H; the magnetochemical sensor 105E is coupled to line 125D and line 125E; the magnetochemical sensor 105F is coupled to line 125D and line 125F; and the magnetochemical sensor 105G is coupled to line 125D and line 125G. In the exemplary embodiment of FIG. 10A, line 125A, line 125B, line 125C, and line 125D are shown residing over the magnetochemical sensors 105, and line 125E, line 125F, line 125G, and line 125H are shown residing under the magnetochemical sensors 105.

The magnetochemical sensors 105 of the exemplary detection device 100 of FIG. 10A are arranged in a rectangular sensor array 110. Each of the lines 125 identifies a row or a column of the sensor array 110. For example, each of line 125A, line 125B, line 125C, and line 125D identifies a different row of the sensor array 110, and each of line 125E, line 125F, line 125G, and line 125H identifies a different column of the sensor array 110.

The lines 125 may be connected to circuitry that allows the magnetochemical sensors 105 in the sensor array 110 to be read. The circuitry can include, for example, one or more processors as well as other components that are well known in the art (e.g., a current source, voltage source, driver, etc.). For example, in operation, the circuitry can apply a current to one or more of the lines 125 to detect a characteristic of at least one of the plurality of magnetochemical sensors 105 in the sensor array 110, where the characteristic indicates the presence of a magnetic particle 102 or the absence of any magnetic particle 102 within range of the magnetochemical sensor 105, as explained above. The circuitry can be dedicated circuitry used only for reading the magnetochemical sensors 105, or it can also be used to generate current through the current-carrying structure(s) 120. The current traversing a current-carrying structure 120 can also traverse a magnetochemical sensor 105.

The detection device 100 shown in FIG. 10A also includes a current-carrying structure array 121, which comprises a current-carrying structure 120A, a current-carrying structure 120B, a current-carrying structure 120C, and a current-carrying structure 120D, each of which is aligned with a row of the sensor array 110. (It is to be understood that each current-carrying structure 120 could alternatively be aligned with a column of the sensor array 110.) The current-carrying structure 120A is configured to carry a current substantially in the +x or −x direction and to create a magnetic field around an axis in the x-direction that draws magnetic particles 102 toward the four magnetochemical sensors 105 in the top row of the sensor array 110 (e.g., the row that includes the magnetochemical sensor 105A). Similarly, the current-carrying structure 120B is configured to carry a current substantially in the +x or −x direction and to create a magnetic field around an axis in the x-direction that draws magnetic particles 102 toward the four magnetochemical sensors 105 in the second-to-top row of the sensor array 110 (e.g., the row that includes the magnetochemical sensor 105B). Likewise, the current-carrying structure 120C is configured to carry a current substantially in the +x or −x direction and to create a magnetic field around an axis in the x-direction that draws magnetic particles 102 toward the four magnetochemical sensors 105 in the second-to-bottom row of the sensor array 110 (e.g., the row that includes the magnetochemical sensor 105C). Finally, the current-carrying structure 120D is configured to carry a current substantially in the +x or −x direction and to create a magnetic field around an axis in the x-direction that draws magnetic particles 102 toward the four magnetochemical sensors 105 in the bottom row of the sensor array 110 (e.g., the row that includes the magnetochemical sensor 105E, the magneto-chemical sensor 105F, the magnetochemical sensor 105C, and the magnetochemical sensor 105D). The current-carrying structure 120A, current-carrying structure 120B, current-carrying structure 120C, and current-carrying structure 120D shown in FIG. 10A can have any suitable form (e.g., as described above in the discussion of FIGS. 8A through 8F). Specifically, they can be one and the same with the upper electrodes 210 or the lower electrodes 212 used to read (interrogate) the magnetochemical sensors 105, or they can be separate from the upper electrode 210 and the lower electrode 212. The current traversing a current-carrying structure 120 can also traverse a magnetochemical sensor 105. Moreover, there can be any suitable number of current-carrying structures 120 in the detection device 100. For example, each magnetochemical sensor 105 could have a dedicated current-carrying structure 120.

The magnetochemical sensors 105 and portions of some of the lines 125 (e.g., line 125E, line 125F, line 125G, and line 125H) are illustrated in FIG. 10A using dashed lines to indicate that they are embedded within the detection device 100. The magnetochemical sensors 105 may be protected (e.g., by an insulator) from the contents of the fluid region 115, which itself might be enclosed. Accordingly, it is to be understood that certain of the various illustrated components (e.g., lines 125, magnetochemical sensors 105, current-carrying structures 120, etc.) are not necessarily visible in a physical instantiation of the detection device 100 (e.g., they may be embedded in or covered by protective material, such as an insulator). Similarly, although FIG. 10A does not specifically illustrate circuitry connected to the current-carrying structures 120, it is to be understood that separate circuitry can be used to generate the current through the current-carrying structures 120, as discussed further below.

To simplify the explanation, FIG. 10A illustrates an exemplary detection device 100 with only sixteen magne-tochemical sensors 105 in the sensor array 110, only four current-carrying structures 120 in the current-carrying struc-ture array 121 (namely, current-carrying structure 120A, current-carrying structure 120B, current-carrying structure 120C, and current-carrying structure 120D), and eight lines 125. It is to be appreciated that the detection device 100 may have fewer or many more magnetochemical sensors 105 in the sensor array 110, and it may have more or fewer current-carrying structures 120. Similarly, embodiments that include lines 125 may have more or fewer lines 125. In general, any configuration of magnetochemical sensors 105 and current-carrying structures 120 that allows the magne-tochemical sensors 105 to detect magnetic particles 102 may be used. Similarly, any configuration of one or more lines 125 or some other mechanism that allows the determination of whether the magnetochemical sensors 105 have sensed one or more magnetic particles 102 may be used. The examples presented herein are not intended to be limiting.

Figure 10B:
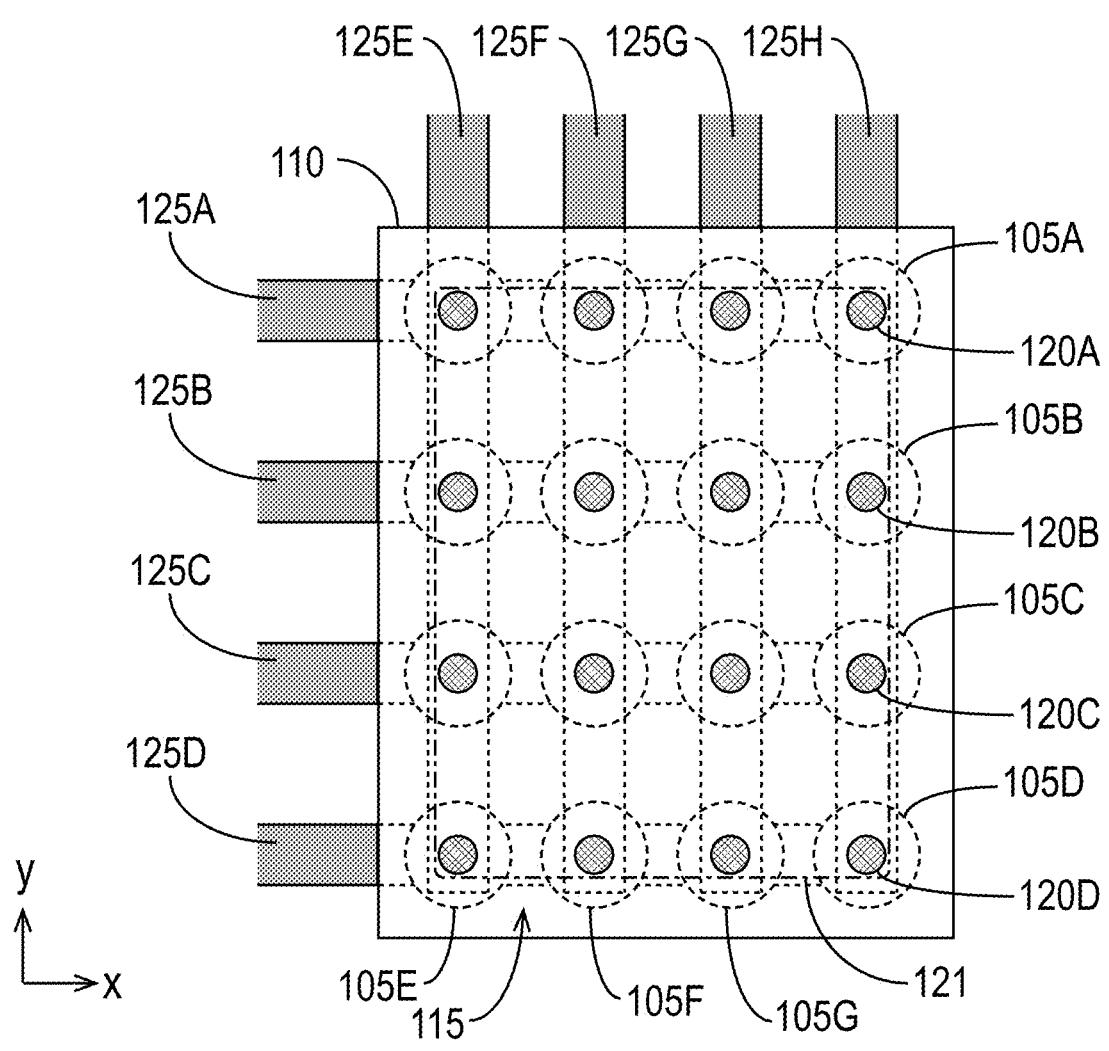
FIG. 10B illustrates portions of an example of another detection device that includes a sensor array of magnetochemical sensors in a rectangular configuration in accordance with some embodiments.

FIG. 10A illustrates a configuration corresponding either to FIG. 9A or FIG. 9B, but it is to be understood that the configuration can alternatively (or additionally) correspond to the configuration shown in FIG. 9C. FIG. 10B illustrates portions of another detection device 100 example that includes a sensor array 110 of magnetochemical sensors 105 in a rectangular configuration in accordance with some embodiments. FIG. 10B is a top view of the detection device 100. Like the detection device 100 shown in FIG. 10A, the sensor array 110 in FIG. 10B includes a plurality of mag-netochemical sensors 105 and a plurality of lines 125 (e.g., connected to circuitry for reading). The magnetochemical sensors 105 in the sensor array 110 and the lines 125 can be as described in the discussion of FIG. 10A. Similarly, as explained in the discussion of FIG. 10A, an implementation of a detection device 100 may include any number of magnetochemical sensors 105 (e.g., hundreds, thousands, etc. of magnetochemical sensors 105), and the magneto-chemical sensors 105 can have any suitable shape and characteristics.

The detection device 100 shown in FIG. 10B also includes a current-carrying structure array 121 that includes a plu-rality of current-carrying structures 120, one per magneto-chemical sensor 105. Specifically labeled are the current-carrying structure 120A over the magnetochemical sensor 105A, current-carrying structure 120B over the magneto-chemical sensor 105B, current-carrying structure 120C over the magnetochemical sensor 105C, and current-carrying structure 120D over the magnetochemical sensor 105D. The current-carrying structure 120A is configured to carry a current substantially in the +z or −z direction (the longitu-dinal direction, either into or out of the page) and to create a magnetic field around a z-axis that draws magnetic par-ticles 102 toward the magnetochemical sensor 105A. Simi-larly, the current-carrying structure 120B is configured to carry a current substantially in the +z or −z direction (the longitudinal direction, either into or out of the page) and to create a magnetic field around a z-axis that draws magnetic particles 102 toward the magnetochemical sensor 105B. Likewise, the current-carrying structure 120C is configured to carry a current substantially in the +z or −z direction (the longitudinal direction, either into or out of the page) and to create a magnetic field around a z-axis that draws magnetic particles 102 toward the magnetochemical sensor 105C. Finally, the current-carrying structure 120D is configured to carry a current substantially in the +z or −z direction (the longitudinal direction, either into or out of the page) and to create a magnetic field around a z-axis that draws magnetic particles 102 toward the magnetochemical sensor 105D. The current-carrying structure 120A, current-carrying structure 120B, current-carrying structure 120C, and current-carrying structure 120D can have any suitable form and can be made from any suitable material(s) (e.g., as described above in the discussion of FIGS. 8A through 8F).

The magnetochemical sensors 105 and portions of some of the lines 125 (e.g., line 125E, line 125F, line 125G, and line 125H) are illustrated in FIG. 10B using dashed lines to indicate that they are embedded within the detection device 100. The magnetochemical sensors 105 may be protected (e.g., by an insulator) from the contents of the fluid region 115, which itself might be enclosed. Accordingly, it is to be understood that certain of the various illustrated components (e.g., lines 125, magnetochemical sensors 105, current-carrying structures 120, etc.) are not necessarily visible in a physical instantiation of the detection device 100 (e.g., they may be embedded in or covered by protective material, such as an insulator). Similarly, although FIG. 10B does not specifically illustrate circuitry connected to the current-carrying structures 120, it is to be understood that separate circuitry can be used to generate the current through the current-carrying structures 120, as discussed further below.

Furthermore, the current traversing a current-carrying structure 120 can also traverse a magnetochemical sensor 105.

To simplify the explanation, FIG. 10B illustrates an exemplary detection device 100 with only sixteen magnetochemical sensors 105 in the sensor array 110, only sixteen current-carrying structures 120 in the current-carrying structure array 121 (four of which are labeled), and eight lines 125. It is to be appreciated that the detection device 100 may have fewer or many more magnetochemical sensors 105 in the sensor array 110, and it may have more or fewer current-carrying structures 120. Similarly, embodiments that include lines 125 may have more or fewer lines 125. In general, any configuration of magnetochemical sensors 105 and current-carrying structures 120 that allows the magnetochemical sensors 105 to detect magnetic particles 102 may be used. Similarly, any configuration of one or more lines 125 or some other mechanism that allows the determination of whether the magnetochemical sensors 105 have sensed one or more magnetic particles 102 may be used. The examples presented herein are not intended to be limiting.

Figure 10C:
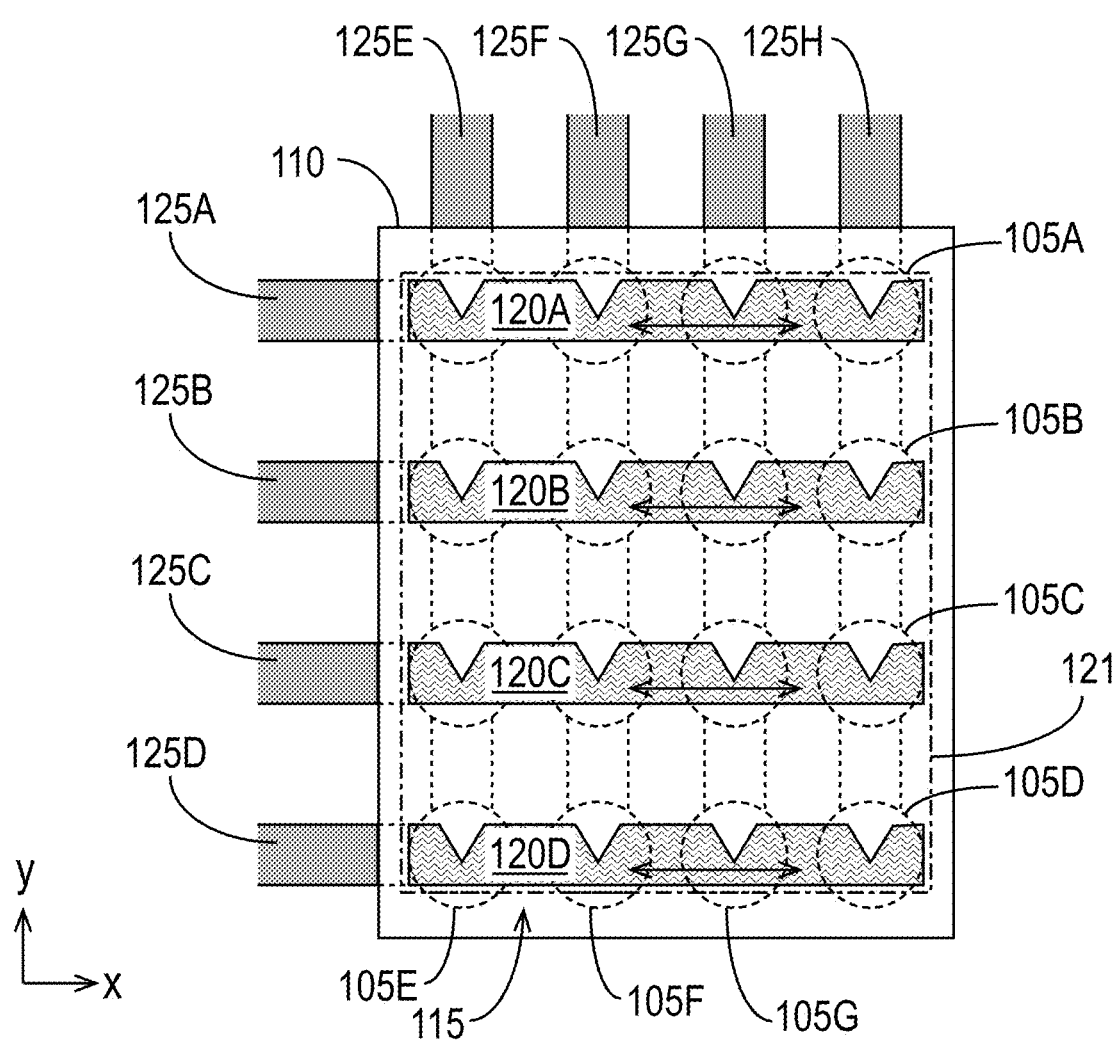
FIG. 10C illustrates portions of an example of another detection device that includes a sensor array of magnetochemical sensors in a rectangular configuration in accordance with some embodiments.

FIG. 10C illustrates portions of another detection device 100 example that includes a sensor array 110 of magnetochemical sensors 105 in a rectangular configuration in accordance with some embodiments. FIG. 10C is a top view of the detection device 100. Like the detection devices 100 shown in FIGS. 10A and 10B, the sensor array 110 in FIG. 10C includes a plurality of magnetochemical sensors 105 and a plurality of lines 125 (e.g., connected to circuitry for reading). The magnetochemical sensors 105 in the sensor array 110 and the lines 125 can be as described in the discussion of FIG. 10A. Similarly, as explained in the discussion of FIG. 10A, an implementation of a detection device 100 may include any number of magnetochemical sensors 105 (e.g., hundreds, thousands, etc. of magnetochemical sensors 105), and the magnetochemical sensors 105 can have any suitable shape and characteristics.

The detection device 100 shown in FIG. 10C also includes a current-carrying structure array 121 that includes a plurality of current-carrying structures 120. Specifically, the detection device 100 example in FIG. 10C includes a current-carrying structure array 121 that comprises a current-carrying structure 120A, a current-carrying structure 120B, a current-carrying structure 120C, and a current-carrying structure 120D, each of which is aligned with a row of the sensor array 110, and each of which has a non-uniform width in the x-direction. (It is to be understood that each current-carrying structure 120 could alternatively be aligned with a column of the sensor array 110, in which case the non-uniform width would be in the y-direction.) The current-carrying structure 120A is configured to carry a current substantially in the +x or −x direction and to create a magnetic field around an axis in the x-direction that draws magnetic particles 102 toward the four magnetochemical sensors 105 in the top row of the sensor array 110 (e.g., the row that includes the magnetochemical sensor 105A). Similarly, the current-carrying structure 120B is configured to carry a current substantially in the +x or −x direction and to create a magnetic field around an axis in the x-direction that draws magnetic particles 102 toward the four magnetochemical sensors 105 in the second-to-top row of the sensor array 110 (e.g., the row that includes the magnetochemical sensor 105B). Likewise, the current-carrying structure 120C is configured to carry a current substantially in the +x or −x direction and to create a magnetic field around an axis in the x-direction that draws magnetic particles 102 toward the four magnetochemical sensors 105 in the second-to-bottom row of the sensor array 110 (e.g., the row that includes the magnetochemical sensor 105C). Finally, the current-carrying structure 120D is configured to carry a current substantially in the +x or −x direction and to create a magnetic field around an axis in the x-direction that draws magnetic particles 102 toward the four magnetochemical sensors 105 in the bottom row of the sensor array 110 (e.g., the row that includes the magnetochemical sensor 105E, the magnetochemical sensor 105F, the magnetochemical sensor 105C, and the magnetochemical sensor 105D). FIG. 10C illustrates current-carrying structures 120 that include repeated instances of the notched current-carrying structure 120 of FIG. 8F as an example, but it is to be appreciated that the current-carrying structure 120A, current-carrying structure 120B, current-carrying structure 120C, and current-carrying structure 120D shown in FIG. 10C can have any suitable form (e.g., as described above in the discussion of FIGS. 8A through 8F, or in any other suitable form).

As explained above, the current-carrying structures 120 shown in FIG. 10C can be one and the same with the upper electrodes 210 or the lower electrodes 212 used to read (interrogate) the magnetochemical sensors 105, or they can be separate from the upper electrode 210 and the lower electrode 212. The current traversing a current-carrying structure 120 can also traverse a magnetochemical sensor 105. Moreover, there can be any suitable number of current-carrying structures 120 in the detection device 100. For example, each magnetochemical sensor 105 could have a dedicated current-carrying structure 120.

As explained above for FIG. 10A, the magnetochemical sensors 105 and portions of some of the lines 125 (e.g., line 125E, line 125F, line 125G, and line 125H) are illustrated in FIG. 10C using dashed lines to indicate that they are embedded within the detection device 100. The magnetochemical sensors 105 may be protected (e.g., by an insulator) from the contents of the fluid region 115, which itself might be enclosed. Accordingly, it is to be understood that certain of the various illustrated components (e.g., lines 125, magnetochemical sensors 105, current-carrying structures 120, etc.) are not necessarily visible in a physical instantiation of the detection device 100 (e.g., they may be embedded in or covered by protective material, such as an insulator). Similarly, although FIG. 10C does not specifically illustrate circuitry connected to the current-carrying structures 120, it is to be understood that separate circuitry can be used to generate the current through the current-carrying structures 120, as discussed further below.

To simplify the explanation, FIG. 10C illustrates an exemplary detection device 100 with only sixteen magnetochemical sensors 105 in the sensor array 110, only sixteen current-carrying structures 120 (four of which are labeled), and eight lines 125. It is to be appreciated that the detection device 100 may have fewer or many more magnetochemical sensors 105 in the sensor array 110, and it may have more or fewer current-carrying structures 120. Similarly, embodiments that include lines 125 may have more or fewer lines 125. In general, any configuration of magnetochemical sensors 105 and current-carrying structures 120 that allows the magnetochemical sensors 105 to detect magnetic particles 102 may be used. Similarly, any configuration of one or more lines 125 or some other mechanism that allows the determination of whether the magnetochemical sensors 105 have sensed one or more magnetic particles 102 may be used. The examples presented herein are not intended to be limiting.

The current applied to the current-carrying structure(s) 120 disclosed and described herein can be any suitable current. For example, the current can be DC, AC, or a superposition of a DC current and an AC current. The use of an AC current of a suitable frequency (or switching on and off a DC current) may be useful to prevent the magnetic particles 102 from becoming stuck in a location within the fluid region 115 where their presence cannot be detected by a magnetochemical sensor 105. The current through a current-carrying structure 120 can be switched on and off using appropriate circuitry such as, for example, a transistor. The frequency of any AC current used can be selected so that induces movement of the magnetic particle 102 but does not interfere substantially with the operation of any magnetochemical sensor 105.

Figure 11A:
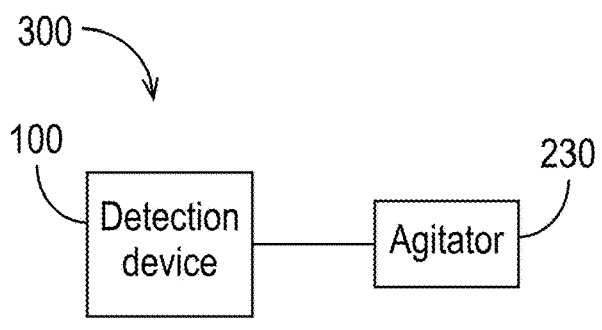
FIG. 11A illustrates a detection system in accordance with some embodiments.

Another way to reduce or prevent the magnetic particles 102 from becoming stuck in locations within the fluid region 115 where they cannot be detected by a magnetochemical sensor 105 is to use an agitator. FIG. 11A illustrates a system 300 that includes an agitator in accordance with some embodiments. The system 300 includes a detection device 100, such as described and illustrated above in the context of, e.g., FIGS. 7A through 10C, and an agitator 230 coupled to the detection device 100. The agitator 230 can comprise any suitable mechanism for agitating the detection device 100 and/or fluid within the fluid region 115 of the detection device 100. For example, the agitator 230 can include an electric motor, an unbalanced mass, a vibration plate, a vibration table, a piezoelectric device (e.g., an piezoelectric actuator, a piezoelectric motor, etc.), or any other device capable of mechanically agitating or vibrating the detection device 100 and/or fluid within the fluid region 115. For example, the agitator 230 can be configured to rotate the detection device 100 in at least two directions (e.g., clockwise and counter-clockwise) or move it along a linear path (e.g., left and right, up and down, etc.) or move it randomly to agitate the contents of the fluid region 115. Alternatively or in addition, the agitator 230 can be configured to pulse the fluid in the fluid region 115.

Figure 11B:
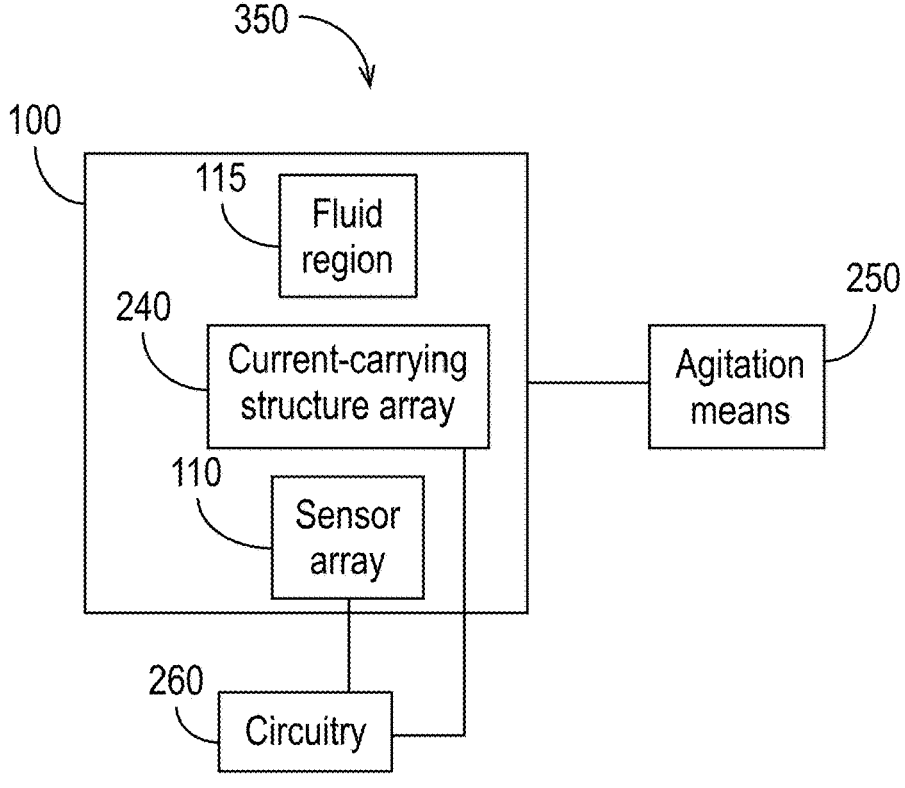
FIG. 11B illustrates another detection system in accordance with some embodiments.

FIG. 11B illustrates another system 350 in accordance with some embodiments. The system 350 includes a detection device 100 and agitation means 250 and circuitry 260 coupled to the detection device 100. The agitation means 250 can comprise at least one of an electric motor, an unbalanced mass, a vibration plate, a vibration table, a piezoelectric actuator, or a piezoelectric motor, or any other device capable of mechanically agitating or vibrating the detection device 100 and/or fluid within the fluid region 115. For example, the agitation means 250 can be configured to rotate the detection device 100 in at least two directions (e.g., clockwise and counter-clockwise) or move it along a linear path (e.g., left and right, up and down, etc.) or move it randomly to agitate the contents of the fluid region 115. Alternatively or in addition, the agitation means 250 can be configured to pulse the fluid in the fluid region 115.

The detection device 100 shown in FIG. 11B can include some or all of the components described above, including the fluid region 115, a sensor array 110, and a current-carrying structure array 240. The current-carrying structure array 240 includes a plurality of current-carrying structures 120 (e.g., any suitable current-carrying structures 120, including but not limited to those illustrated in FIGS. 8A through 8F). The number of current-carrying structures 120 in the current-carrying structure array 240 can be the same as or different from the number of magnetochemical sensors 105 in the sensor array 110. In other words, the current-carrying structures 120 in the current-carrying structure array 240 can be in a one-to-one relationship with the magnetochemical sensors 105 in the sensor array 110, or there can be more or fewer current-carrying structures 120 than magnetochemical sensors 105 in the detection device 100 (i.e., a current-carrying structure 120 can be shared by multiple magnetochemical sensors 105).

Figure 11C:
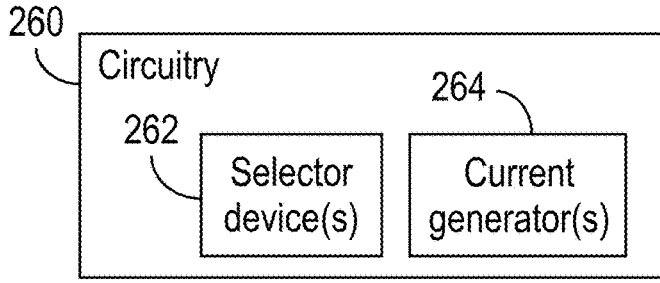
FIG. 11C illustrates an example of the circuitry of FIG. 11B in accordance with some embodiments.

The system 350 can also include circuitry 260, which, as illustrated in FIG. 11B, can be coupled to the sensor array 110 and/or the current-carrying structure array 240. The circuitry 260 can include, for example, current generator(s) 264, as illustrated in FIG. 11C. The current generator(s) 264 can be configured to generate an AC current, a DC current, and/or a superposition of a DC current and an AC current. The current generator(s) 264 can be dedicated to the current-carrying structures 120, or it can also be used to read the magnetochemical sensors 105 in the sensor array 110.

The circuitry 260 can also, or alternatively, include systems or devices to control one or more current-carrying structures 120 (e.g., the current-carrying structure array 240). For example, the circuitry 260 can be coupled to the particle attraction circuit and configured to cause a current to flow through the current-carrying structure 120. Alternatively, the particle attraction circuit itself can include control circuitry to cause a current to flow through the current-carrying structure 120.

The circuitry 260 can also, or alternatively, include systems or devices to detect one or more characteristics of magnetochemical sensors 105, such as, for example a change in resistance. For example, the circuitry 260 can include an ohmmeter, a voltage detector, a current detector, etc. Generally speaking, the circuitry 260 can include any component that allows the circuitry 260 to detect a characteristic of a magnetochemical sensor 105 that can be interpreted to distinguish between when at least one magnetic particle 102 is present and when no magnetic particle 102 is present.

The circuitry 260 can also, or alternatively, include selector device(s) 262. If present, the selector device(s) 262 can be or comprise, for example, transistors or similar devices that can be used to access individual magnetochemical sensors 105 in the sensor array 110 and/or individual current-carrying structures 120 in the current-carrying structure array 240. The selector device(s) 262 can alternatively or additionally comprise an in-stack selector, such as to select individual magnetochemical sensors 105 in the sensor array 110. The plurality of magnetochemical sensors 105 in the sensor array 110 can be in a one-to-one relationship with selector device(s) 262 in the circuitry 260. In embodiments in which the circuitry 260 includes selector device(s) 262, some of the selector device(s) 262 can be used to read (interrogate) the magnetochemical sensors 105, and others can be used to activate/control the current-carrying structure array 240. In other embodiments, individual selector device(s) 262 can be used to control/activate some or all of the sensor array 110 and/or some or all of the current-carrying structure array 240.

It is to be appreciated that although FIG. 11B shows the circuitry 260 and the agitation means 250 as separate from the detection device 100, the circuitry 260 and/or the agitation means 250 can be included in the detection device 100.

Figure 12A:
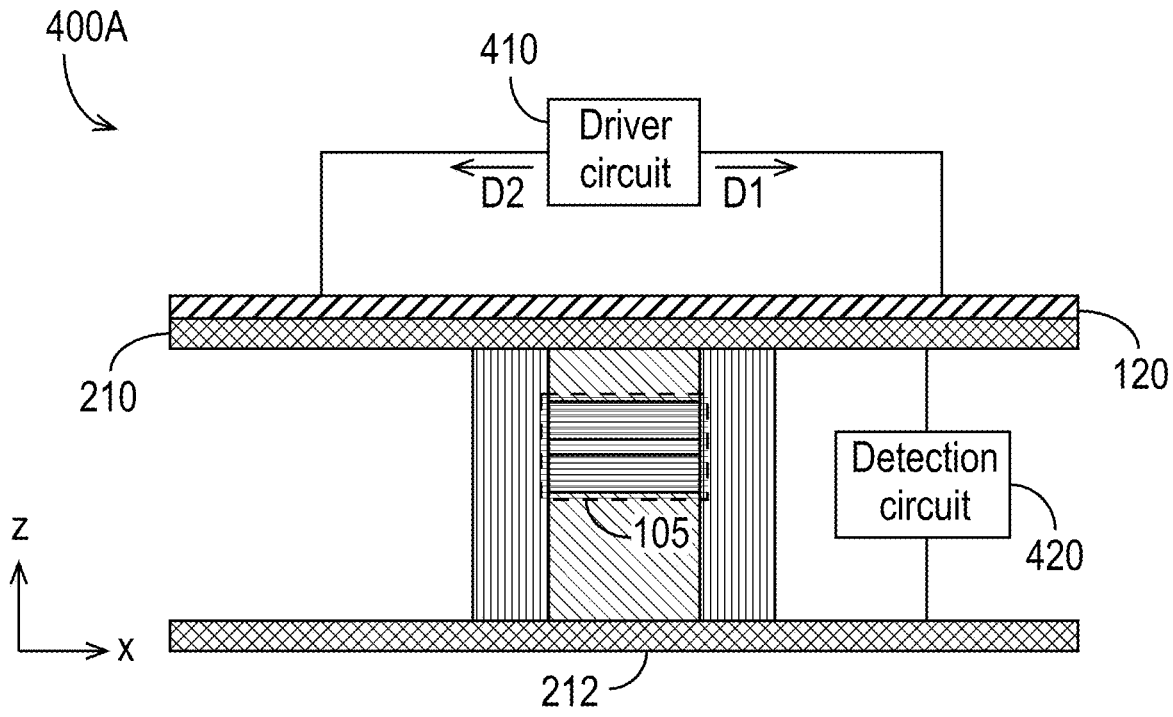
FIG. 12A illustrates an example of a system that can be used to detect magnetic particles in accordance with some embodiments.

There are a number of ways to use the current-carrying structure 120 and to read a magnetochemical sensor 105 to detect magnetic particles 102. FIG. 12A illustrates an example of a system 400A that can be used to detect magnetic particles 102 in accordance with some embodiments. The system 400A illustrated in the example of FIG. 12A includes the magnetochemical sensor 105, current-carrying structure 120, upper electrode 210, and lower electrode 212 described above. It is to be understood that the current-carrying structure 120 and the upper electrode 210 are illustrated as separate components for ease of explanation, but they can be one and the same, as explained above. As shown in FIG. 12A, the system 400A includes a driver circuit 410 coupled to the current-carrying structure 120. The driver circuit 410 can be configured to generate current in the direction D1 and/or the direction D2. In other words, the driver circuit 410 may be able to operate with a first polarity and/or with a second polarity. In some embodiments, the driver circuit 410 has a fixed polarity. In some embodiments, the polarity of the driver circuit 410 is selectable so that the direction of the current flowing through the current-carrying structure 120 can be changed. The driver circuit 410 can include any suitable components. Examples include a battery, a DC voltage source, an AC voltage source, a DC current source, or an AC current source.

The system 400A shown in the example of FIG. 12A also includes a detection circuit 420 coupled to the upper electrode 210 and the lower electrode 212. The detection circuit 420 can be or comprise, for example, some or all of the circuitry 260 as described above in the discussion of FIGS. 11A through 11C.

It will be appreciated that if the current-carrying structure 120 and the upper electrode 210 are not electrically isolated from each other, the driver circuit 410 generates a common-mode signal that can be detected by the detection circuit 420. Nevertheless, the system 400A can be used to implement a variety of methods to detect magnetic particles 102 when the current-carrying structure 120 and the upper electrode 210 are one and the same or are not electrically isolated. Examples of such methods are described below in the context of FIGS. 13A, 13B, 13C, and 13D.

Figure 12B:
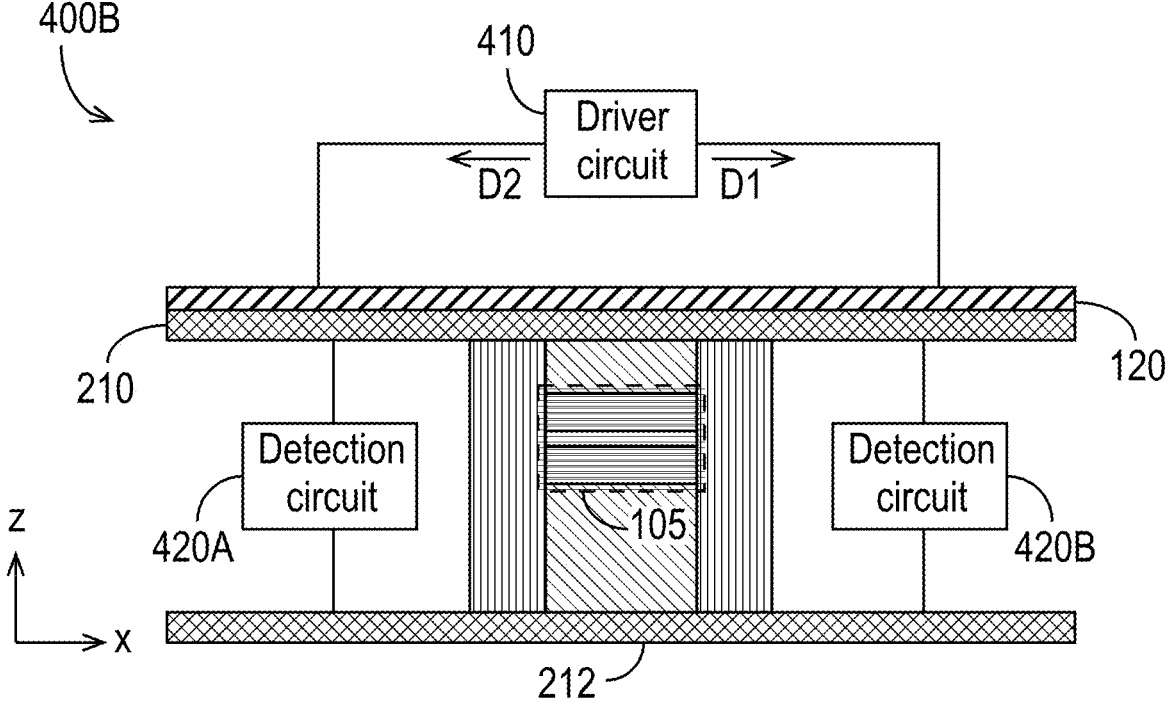
FIG. 12B illustrates another example of a system that can be used to detect magnetic particles in accordance with some embodiments.

FIG. 12B illustrates another example of a system 400B that can be used to detect magnetic particles 102 in accordance with some embodiments. The system 400B illustrated in the example of FIG. 12B includes the magnetochemical sensor 105, current-carrying structure 120, upper electrode 210, and lower electrode 212 described above. It is to be understood that the current-carrying structure 120 and the upper electrode 210 are illustrated in FIG. 12B (as in FIG. 12A) as separate components for ease of explanation, but they can be one and the same, as explained above. As shown in FIG. 12B, the system 400B includes a driver circuit 410 coupled to the current-carrying structure 120. The driver circuit 410 can be as described above for FIG. 12A. The system 400B shown in the example of FIG. 12B also includes a first detection circuit 420A coupled to the upper electrode 210 and the lower electrode 212 on one side of the magnetochemical sensor 105, and a second detection circuit 420B coupled to the upper electrode 210 and the lower electrode 212 on the other side of the magnetochemical sensor 105. The first detection circuit 420A and the second detection circuit 420B can be, for example, as described above in the discussion of FIG. 12A.

It will be appreciated that if the current-carrying structure 120 and the upper electrode 210 are not electrically isolated from each other, the driver circuit 410 generates a common-mode signal that is detected by the first detection circuit 420A and the second detection circuit 420B. The system 400B of FIG. 12B can be used to detect magnetic particles 102 in a variety of ways. For example, the offset due to the common-mode signal can be quantified as the difference between the measurement taken by the first detection circuit 420A and the measurement taken by the second detection circuit 420B. As another example, each of the first detection circuit 420A and second detection circuit 420B can take a measurement while current flows through the current-carrying structure 120 in a first direction, the polarity of the current can be flipped, and each of the first detection circuit 420A and second detection circuit 420B can take a second measurement while the current flows through the current-carrying structure 120 in the second direction. The offset due to the common-mode signal can be substantially removed by, for example, averaging the measurements taken by the first detection circuit 420A and the second detection circuit 420B.

FIGS. 13A through 13D are flow diagrams of methods that can be used, for example, with the system 400A shown in FIG. 12A to detect magnetic particles 102. FIGS. 13A through 13D refer to a particle attraction circuit and a detection circuit. The particle attraction circuit may comprise, for example, a current-carrying structure 120 and the driver circuit 410 described above in the discussion of FIG. 12A. The detection circuit may be or comprise, for example, the detection circuit 420 described above.

Figure 13A:
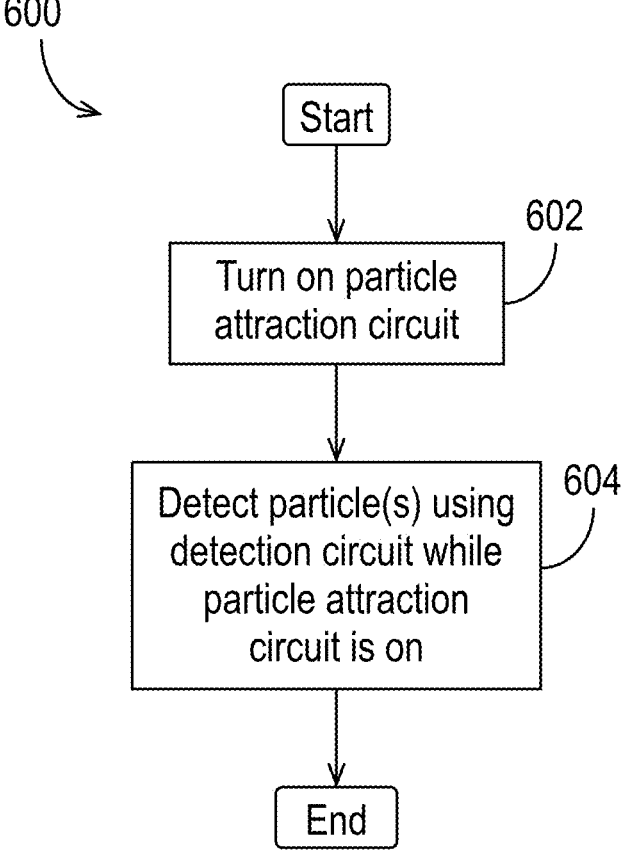
FIGS. 13A, 13B, 13C, and 13D illustrate examples of methods that can be used to detect magnetic particles in accordance with some embodiments.

FIG. 13A illustrates an example of a method 600 that can be used to detect magnetic particles 102. After the method 600 starts, at block 602, the particle attraction circuit is turned on (e.g., using control circuitry) to generate a current through the current-carrying structure 120. At block 604, while the particle attraction circuit remains on, the detection circuit is used to detect magnetic particles 102. Optionally, a period of time may be allowed to elapse before the detection step. Also optionally, the contents of the fluid region 115 can be agitated to reduce stiction and improve the likelihood that magnetic particles 102 are attracted to the current-carrying structure 120. The measurement(s) obtained by the detection circuit will include an offset due to the current through the current-carrying structure 120, but because the particle attraction circuit remains on during the measurements, the offset is substantially constant over time. Therefore, the offset can be ignored, or it can be quantified and its value subtracted from the detection result.

Figure 13B:
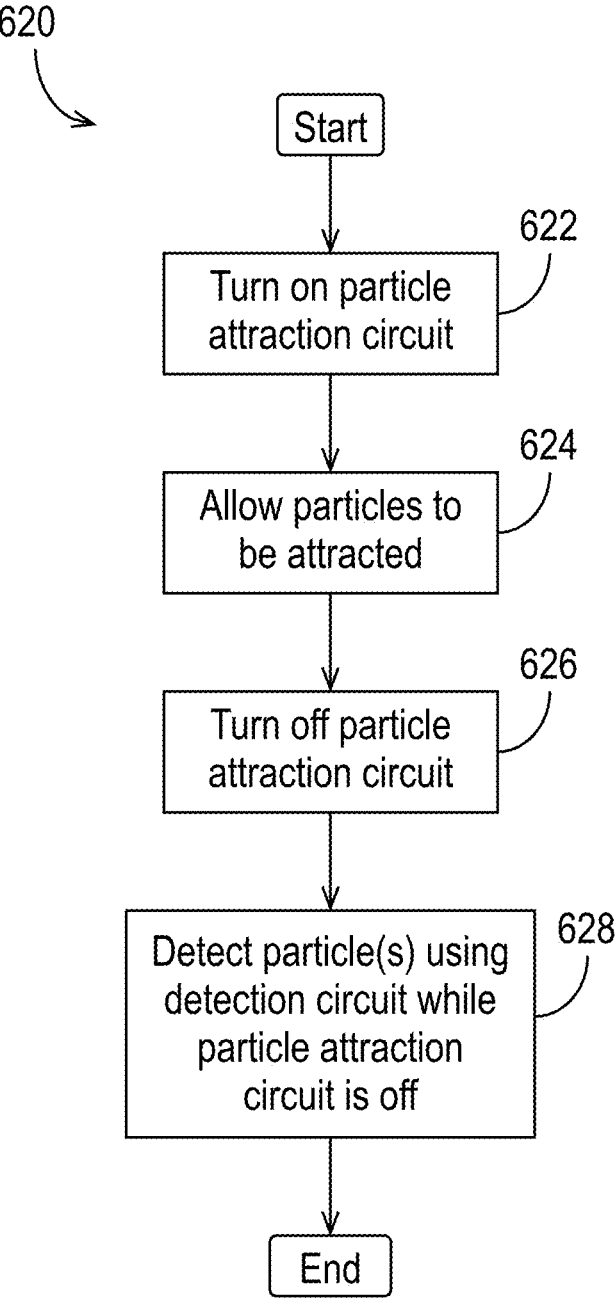

FIG. 13B illustrates another example of a method 620 that can be used to detect magnetic particles 102 using a detection device comprising a particle attraction circuit and a detection circuit in accordance with some embodiments. After the method 620 starts, at block 622, the particle attraction circuit is activated (turned on). The particle attraction circuit comprises a current-carrying structure 120 as described herein. Activating the particle attraction circuit (e.g., using control circuitry) causes current to flow through the current-carrying structure 120. At optional block 624, some period or amount of time is allowed to elapse while magnetic particle(s) 102 are attracted to the current-carrying structure 120. Optionally during block 624, the detection device can be agitated to cause the magnetic particles 102 to move more than they might otherwise, thereby improving the likelihood that particles are attracted to the current-carrying structure 120.

At block 626, the particle attraction circuit is deactivated (turned off) (e.g., using control circuitry), which stops the current from flowing through the current-carrying structure 120. Magnetic particles 102 that were previously drawn toward the current-carrying structure 120 should remain substantially in place after the particle activation circuit is deactivated and current no longer flows through the current-carrying structure 120 (e.g., due to stiction).

At block 628, the detection circuit is used to detect magnetic particles 102 while the particle attraction circuit is off (and no current flows through the current-carrying structure 120). As described elsewhere herein, the detection circuit is configured to read a magnetochemical sensor 105. In some embodiments, the detection circuit obtains a first measurement result that provides at least one characteristic of the magnetochemical sensor, where the at least one characteristic indicates whether at least one magnetic particle has been detected by the magnetochemical sensor. Because the detection circuit takes the measurement while the particle attraction circuit is off, the measurement is not affected by the common-mode signal (offset) described above in the discussion of FIG. 13A.

Figure 13C:
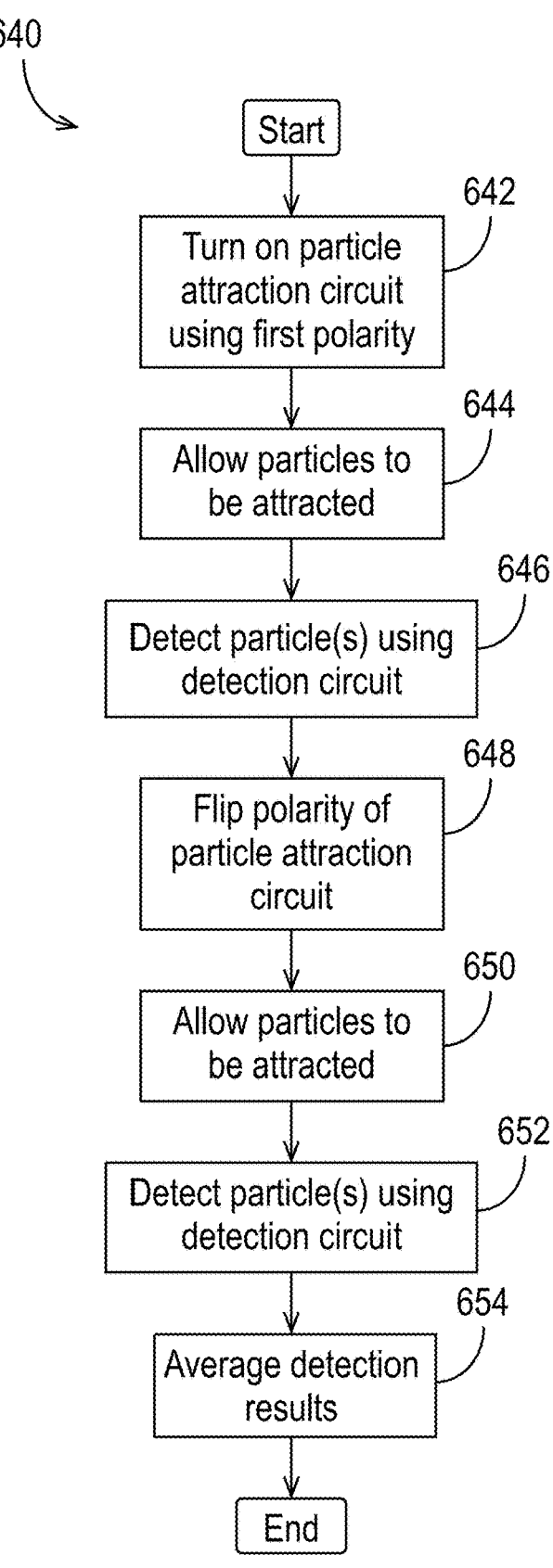

FIG. 13C illustrates another example of a method 640 that can be used to detect magnetic particles 102 using a detection device comprising a particle attraction circuit and a detection circuit in accordance with some embodiments. As described above, the particle attraction circuit comprises a current-carrying structure, and the detection circuit is configured to read a magnetochemical sensor. After the method 640 starts, at block 642, the particle attraction circuit is turned on (e.g., using control circuitry) so that it generates current having a first polarity (direction). For example, the particle attraction circuit can include the driver circuit 410 and the current-carrying structure 120 shown in FIG. 12A, and the particle attraction circuit causes current to flow in the direction D1 or the direction D2. At optional block 644, some amount of time is allowed to elapse while magnetic particle(s) 102 are attracted to the current-carrying structure 120. Optionally at block 644, the detection device can be agitated to cause the magnetic particles 102 to move more than they might otherwise, thereby improving the likelihood that particles are attracted to the current-carrying structure 120.

At block 646, the detection circuit is used to detect magnetic particles 102. Specifically, the particle detection circuit obtains a first measurement result, the first measurement result providing at least one characteristic of the magnetochemical sensor 105 that indicates whether at least one magnetic particle has been detected by the magnetochemical sensor 105. The detection can be performed with the particle attraction circuit turned on.

At block 648, the polarity of the particle attraction circuit is reversed (flipped) so that current flows in the opposite direction through the current-carrying structure 120. In other words, the particle attraction circuit causes current to flow in a second direction through the current-carrying structure, where the second direction is opposite the first direction. At optional block 650, some amount of time is allowed to elapse while magnetic particle(s) 102 are attracted to the current-carrying structure 120. Optionally at block 650, the detection device can be agitated to cause the magnetic particles 102 to move more than they might otherwise, thereby improving the likelihood that particles are attracted to the current-carrying structure 120.

At block 652, the detection circuit is used to detect magnetic particles 102. Specifically, the particle detection circuit obtains a second measurement result, the second measurement result providing the at least one characteristic of the magnetochemical sensor 105 that indicates whether at least one magnetic particle has been detected by the magnetochemical sensor 105. The detection can be performed with the particle attraction circuit turned on.

At block 654, the first measurement result from block 646 and the second measurement result from block 652 are averaged to remove the effect of the common-mode signal caused by the particle attraction circuit being on during the measurements. Based at least in part on the result of the averaging, it can be determined whether at least one magnetic particle has been detected by the magnetochemical sensor 105.

Figure 13D:
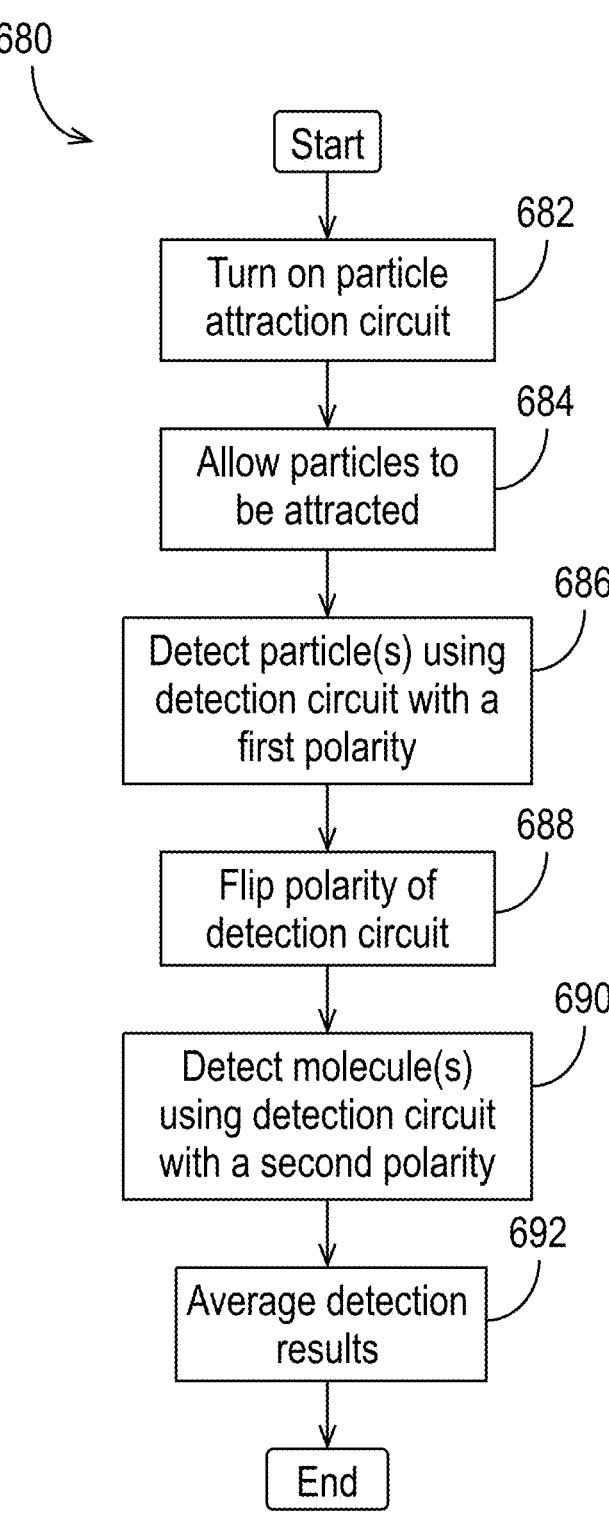

FIG. 13D illustrates another example of a method 680 that can be used to detect magnetic particles 102 using a detection device comprising a particle attraction circuit and a detection circuit in accordance with some embodiments. As described above, the particle attraction circuit comprises a current-carrying structure, and the detection circuit is configured to read a magnetochemical sensor. For the method 680, the detection circuit has a selectable polarity (e.g., a first polarity and a second polarity, where the first and second polarities are opposite). Thus, method 680 can be used with particle attraction circuits that generate current in only one direction and with detection circuits that can operate with a first polarity and a second polarity, where the first polarity is opposite the second polarity. After the method 680 starts, at block 682, the particle attraction circuit is turned on. For example, the particle attraction circuit can include the driver circuit 410 and the current-carrying structure 120 shown in FIG. 12A, and the current can flow in the direction D1 or the direction D2. At optional block 684, some amount of time is allowed to elapse while magnetic particle(s) 102 are attracted to the current-carrying structure 120. Optionally at block 684, the detection device can be agitated to cause the magnetic particles 102 to move more than they might otherwise, thereby improving the likelihood that particles are attracted to the current-carrying structure 120.

At block 686, the detection circuit is used with a first polarity to detect magnetic particles 102. In other words, the particle detection circuit obtains a first measurement result using a selected first polarity, where the first measurement result provides at least one characteristic of the magnetochemical sensor 105 that indicates whether at least one magnetic particle has been detected by the magnetochemical sensor. The detection can be performed with the particle attraction circuit turned on.

At block 688, the polarity of the detection circuit is reversed (flipped). At block 690, the detection circuit is used with the second polarity to detect magnetic particles 102. In other words, the particle detection circuit obtains a second measurement result using a selected second polarity that is opposite the selected first polarity, where the second measurement result provides the at least one characteristic of the magnetochemical sensor 105. The detection can be performed with the particle attraction circuit turned on.

At block 692, the first measurement result from block 686 and the second measurement result from block 690 are averaged to remove the effect of the common-mode signal caused by the particle attraction circuit being on during the measurements. Based at least in part on the result of the averaging, it can be determined whether at least one magnetic particle has been detected by the magnetochemical sensor 105.

Figure 14:
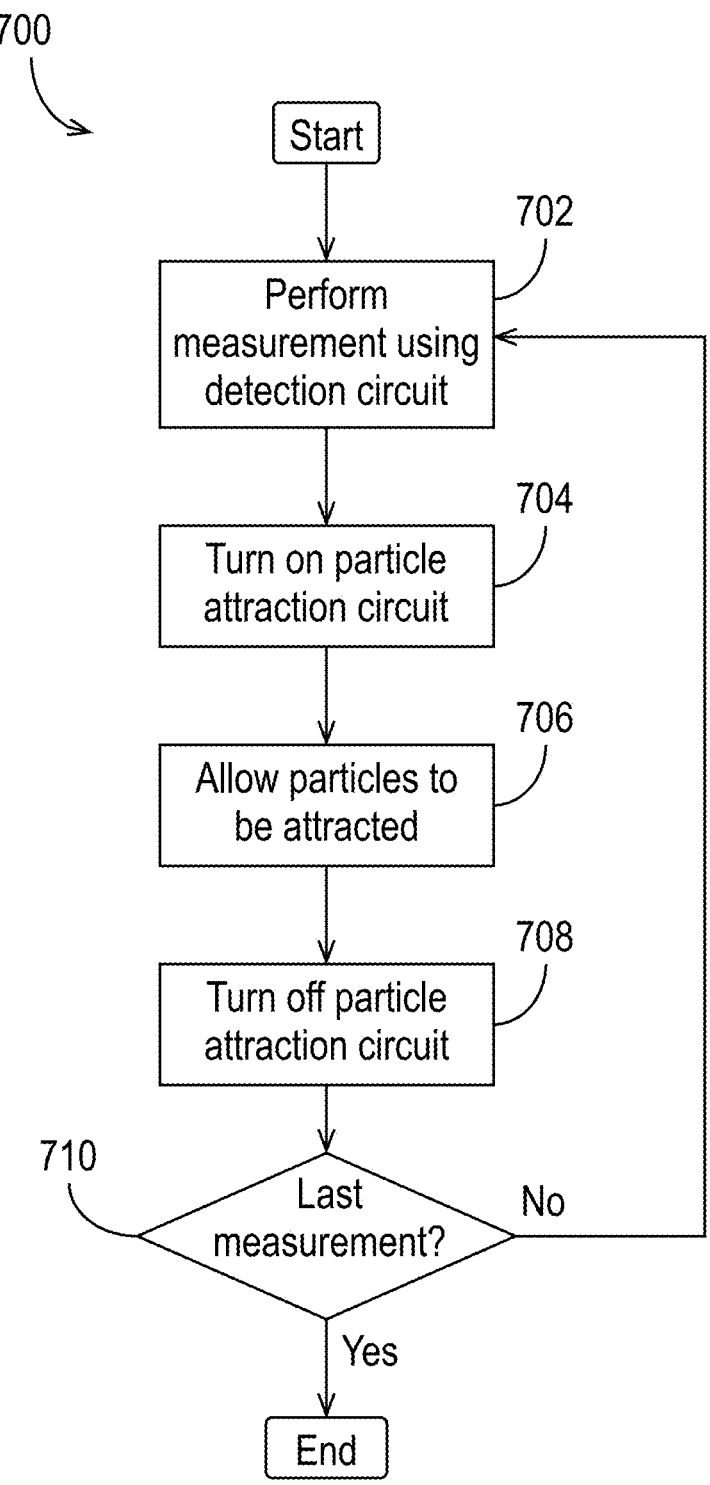
FIG. 14 illustrates an example of another method that can be used to detect magnetic particles in accordance with some embodiments.

FIG. 14 illustrates an example of a method 700 that can be used to detect magnetic particles 102 in accordance with some embodiments. The method 700, which can be used, for example, with the system 400A and/or the system 400B, can be used to detect the movement and/or aggregation of magnetic particles 102. After the method 700 starts, at block 702, a measurement is performed using the detection circuit. The measurement in block 702 can be performed using any of the techniques described above (e.g., in the context of FIGS. 12A, 12B, 13A, 13B, 13C, and/or 13D). At block 704, the particle attraction circuit is turned on to attract particles to the current-carrying structure 120. The particle attraction circuit can include, for example, the current-carrying structure 120 and the driver circuit 410 described above. The driver circuit 410 can be configured to generate current through the current-carrying structure 120 in a single direction or in either of two directions, as described above.

At optional block 706, some amount of time is allowed to elapse while magnetic particle(s) 102 are attracted to the current-carrying structure 120. Optionally at block 706, the contents of the fluid region 115 can be agitated to cause the magnetic particles 102 to move more than they might otherwise, thereby improving the likelihood that particles are attracted to the current-carrying structure 120.

At block 708, the particle attraction circuit is turned off. At decision point 710, it is determined whether the measurement process is complete. For example, it can be determined at decision point 710 whether the value of a measured characteristic of the magnetochemical sensor 105 is substantially constant (has reached a steady-state value) relative to one or more previously measured values of that same characteristic (e.g., a resistance, voltage, current, oscillation frequency, frequency noise, etc.). If so, it can be concluded that magnetic particles 102 in the fluid region 115 have reached substantially steady-state positions, and the method 700 ends. If not, the method 700 returns to block 702. The method 700 can be used to determine whether the magnetic particles 102 are still moving in the fluid region 115 and/or being attracted to the current-carrying structure 120, or if a quiescent (or steady) state has been reached.

The methods described above can be used with any of the detection devices 100 or systems (e.g., system 300, system 350, system 400A, system 400B) described herein, or other similar devices or systems. The examples provided herein are not intended to be limiting.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A detection device, comprising:
   a fluid region;
   a magnetochemical sensor for detecting magnetic particles in the fluid region,
      wherein the magnetochemical sensor comprises:
         a first ferromagnetic layer,
         a second ferromagnetic layer, and
         a spacer layer situated between and coupled to the first ferromagnetic layer and the second ferromagnetic layer; and
   a current-carrying structure for drawing the magnetic particles in the fluid region toward the magnetochemical sensor,
   wherein:
      the current-carrying structure consists of a single, undivided structure, and
      the current-carrying structure is configured to carry a current in at least one direction that is substantially parallel to an in-plane axis or a longitudinal axis of the magnetochemical sensor.

2. The detection device recited in claim 1, wherein the current-carrying structure comprises an electrode coupled to the magnetochemical sensor, the electrode for reading the magnetochemical sensor.

3. The detection device recited in claim 1, wherein a width or thickness of the current-carrying structure is non-uniform.

4. The detection device recited in claim 1, wherein the current-carrying structure comprises a trace or a via of a printed circuit board.

5. The detection device recited in claim 1, wherein the current-carrying structure is configured to carry the current in two directions that are substantially parallel to the in-plane axis or the longitudinal axis of the magnetochemical sensor.

6. The detection device recited in claim 1, wherein the magnetochemical sensor is one of a plurality of magneto-chemical sensors included in the detection device.

7. The detection device recited in claim 6, wherein the plurality of magnetochemical sensors is arranged in a rectangular array, and wherein the at least one direction is aligned with a row or a column of the rectangular array.

8. The detection device recited in claim 7, wherein the current-carrying structure comprises an electrode for reading a row or a column of the rectangular array.

9. The detection device recited in claim 8, wherein the electrode is a first electrode, and further comprising a second electrode coupled to the magnetochemical sensor, the second electrode for reading the magnetochemical sensor.

10. The detection device recited in claim 7, wherein the current-carrying structure comprises a wire mesh.

11. The detection device recited in claim 10, wherein the wire mesh is situated in the fluid region.

12. The detection device recited in claim 1, wherein the current-carrying structure comprises a trace situated in a wafer or a printed circuit board.

13. The detection device recited in claim 12, wherein the fluid region is situated between the magnetochemical sensor and the wafer or printed circuit board.

14. A system comprising:
the detection device recited in claim 1; and
an agitator.

15. The system recited in claim 14, wherein the agitator is configured to mechanically agitate the detection device or to pulse fluid in the fluid region.

16. A method of using the detection device recited in claim 1, the method comprising:
causing the current to flow through the current-carrying structure; and
obtaining a first measurement result, the first measurement result providing at least one characteristic of the magnetochemical sensor, the at least one characteristic indicating whether at least one magnetic particle has been detected by the magnetochemical sensor.

17. The method of claim 16, further comprising:
while the current flows through the current-carrying structure, waiting for a period of time to allow the at least one magnetic particle to be attracted to the current-carrying structure.

18. The method of claim 16, further comprising:
while the current flows through the current-carrying structure, agitating a contents of the fluid region.

19. The method of claim 16, further comprising:
stopping the current from flowing through the current-carrying structure before obtaining the first measurement result.

20. The method of claim 16, wherein obtaining the first measurement result occurs while the current flows through the current-carrying structure.

21. A method of using the detection device recited in claim 1, the method comprising:
causing a current to flow in a first direction through the current-carrying structure;

obtaining a first measurement result while the current flows in the first direction through the current-carrying structure, the first measurement result providing at least one characteristic of the magnetochemical sensor, the at least one characteristic indicating whether at least one magnetic particle has been detected by the magneto-chemical sensor;

causing the current to flow in a second direction through the current-carrying structure, wherein the second direction is opposite the first direction;

obtaining a second measurement result while the current flows in the second direction through the current-carrying structure, the second measurement result providing the at least one characteristic of the magneto-chemical sensor;

determining an average of the first measurement result and the second measurement result; and based at least in part on the average, determining whether at least one magnetic particle has been detected by the magnetochemical sensor.

22. The method of claim 21, further comprising:
before obtaining the first measurement result, and/or before obtaining the second measurement result, waiting for a period of time to allow the at least one magnetic particle to be attracted to the current-carrying structure.

23. The method of claim 21, further comprising:
while the current flows in the first direction through the current-carrying structure, agitating a contents of the fluid region; and
while the current flows in the second direction through the current-carrying structure, agitating the contents of the fluid region.

24. A system, comprising:
a detection device comprising:
a fluid region,
an magnetochemical sensor array comprising a plurality of magnetochemical sensors, each magneto-chemical sensor of the plurality of magnetochemical sensors for detecting magnetic particles in the fluid region, and
an array of current-carrying structures situated over the magnetochemical sensor array, wherein the array of current-carrying structures is configured to draw the magnetic particles in the fluid region toward the magnetochemical sensor array, wherein the array of current-carrying structures is situated in a wafer or printed circuit board, and wherein the fluid region is situated between the magnetochemical sensor array and the wafer or printed circuit board; and
means for agitating fluid in the fluid region.

25. The system recited in claim 24, further comprising:
circuitry to read the plurality of magnetochemical sensors, the circuitry including a plurality of selector devices, wherein the circuitry comprises a current generator configured to generate an AC current and/or a super-position of a DC current and an AC current.

26. The system recited in claim 24, wherein the array of current-carrying structures comprises a wire mesh situated in the fluid region.

* * * * *